US012377337B1

(12) United States Patent
Deans et al.

(10) Patent No.: US 12,377,337 B1
(45) Date of Patent: Aug. 5, 2025

(54) ATHLETIC PERFORMANCE ANALYSIS AND TRAINING SYSTEM AND METHOD

(71) Applicant: Be ONE Sports, LLC, Houston, TX (US)

(72) Inventors: Scott Deans, Houston, TX (US); Luo Wang, Sugar Land, TX (US); James McNaney, Houston, TX (US)

(*) Notice: Subject to any disclaimer, the term of this patent is extended or adjusted under 35 U.S.C. 154(b) by 334 days.

(21) Appl. No.: 18/100,999

(22) Filed: Jan. 24, 2023

Related U.S. Application Data

(60) Provisional application No. 63/302,311, filed on Jan. 24, 2022.

(51) Int. Cl.
*A63B 71/06* (2006.01)
*G09B 19/00* (2006.01)

(52) U.S. Cl.
CPC ...... *A63B 71/0619* (2013.01); *G09B 19/0038* (2013.01); *A63B 2071/0647* (2013.01)

(58) Field of Classification Search
CPC ........ A63B 71/0619; A63B 2071/0647; G09B 19/0038
USPC .......................................................... 700/91
See application file for complete search history.

(56) References Cited

U.S. PATENT DOCUMENTS

| | | | | |
|---|---|---|---|---|
| 8,622,795 | B2* | 1/2014 | Edis ...................... | A63F 13/816 36/39 |
| 9,011,293 | B2* | 4/2015 | Shavit ................ | A63B 24/0006 482/8 |
| 9,878,206 | B2* | 1/2018 | Rowe ........................ | G06T 7/66 |
| 2010/0173732 | A1* | 7/2010 | Vaniche ............ | A63B 24/0003 473/422 |
| 2011/0275045 | A1* | 11/2011 | Bhupathi ............. | G09B 19/003 434/247 |
| 2015/0257682 | A1* | 9/2015 | Hansen ................ | A61B 5/1121 382/103 |
| 2021/0008413 | A1* | 1/2021 | Asikainen ............. | G06F 3/0304 |

* cited by examiner

*Primary Examiner* — Allen Chan
(74) *Attorney, Agent, or Firm* — Intellectual Property Consulting, LLC; Mark N. Melasky; Jared K. Rovira

(57) ABSTRACT

A computer-implemented method of analyzing and training athletic performance implemented on one or more processors and associated memory includes the steps of capturing a series of images of an individual performing an isolated athletic action; recognizing from said series of images of said isolated athletic action performed; identifying input training markers of said isolated athletic action in said series of images; smoothing said identified input training markers of said isolated athletic action in said series of images to identify and replace anomalies to create a feature curve or continuous estimate of the individual's movement between said images; generating a visual overlay of a set of standardized performance indicators of input training markers on said series of images; and calculating a score of said individual's input training markers of said isolated athletic action relative to said set of standardized performance indicators of input training markers.

13 Claims, 26 Drawing Sheets
(24 of 26 Drawing Sheet(s) Filed in Color)

Correlation Significance by ITM

| Attribute Coefficient | Std. Error | t-stat | p-value | Code |
|---|---|---|---|---|
| Homebase | 0.046 | 0.069 | 0.660 | 0.511 | |
| Extension | 0.021 | 0.076 | 0.282 | 0.779 | |
| Cockpit | 0.00003 | 0.000 | 7.631 | 0.000 | **** |
| Landing | 0.023 | 0.003 | 7.826 | 0.000 | **** |

Learning Significance by ITM

| | Homebase | Extension | Cockpit | Landing |
|---|---|---|---|---|
| Cond. 1 | .003 | .19 | .04 | .76 |
| Cond. 2 | .06 | .09 | .11 | .34 |
| Cond. X | .779 | .000 | .000 | .040 |
| | .286 | .003 | .05 | .38 |

Leads to Impact Weight assigned

Figure 5

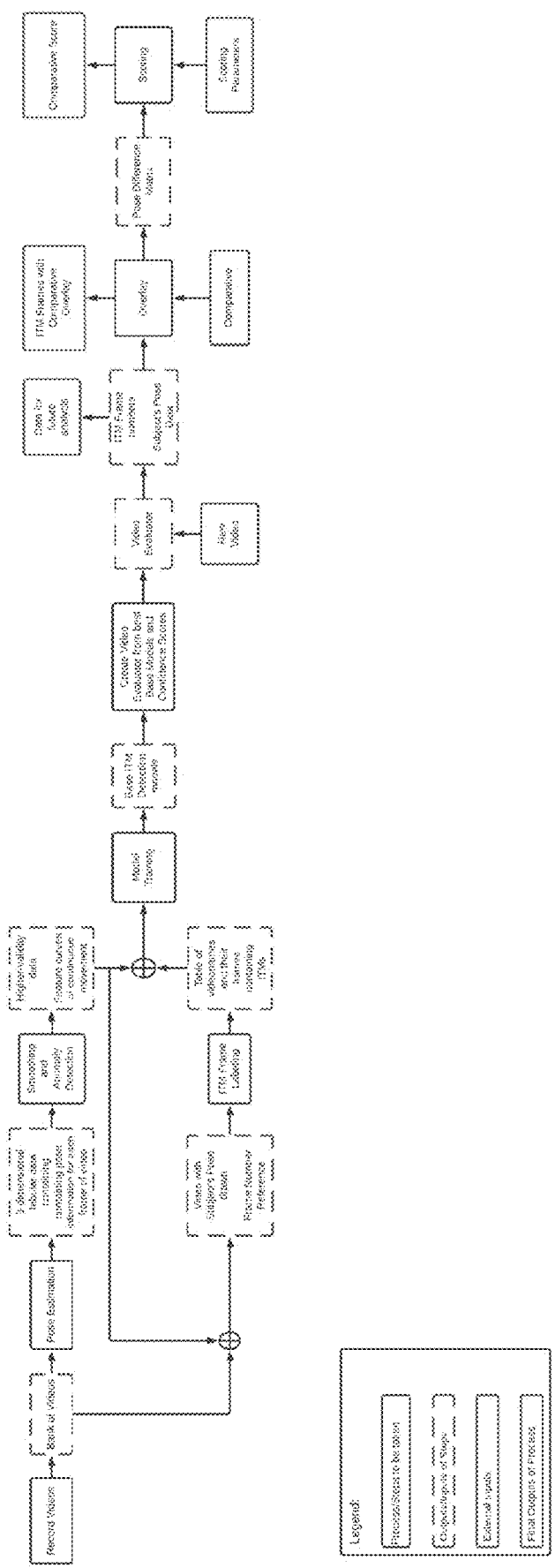
Figure 8: Overall ITM Identification Flowchart

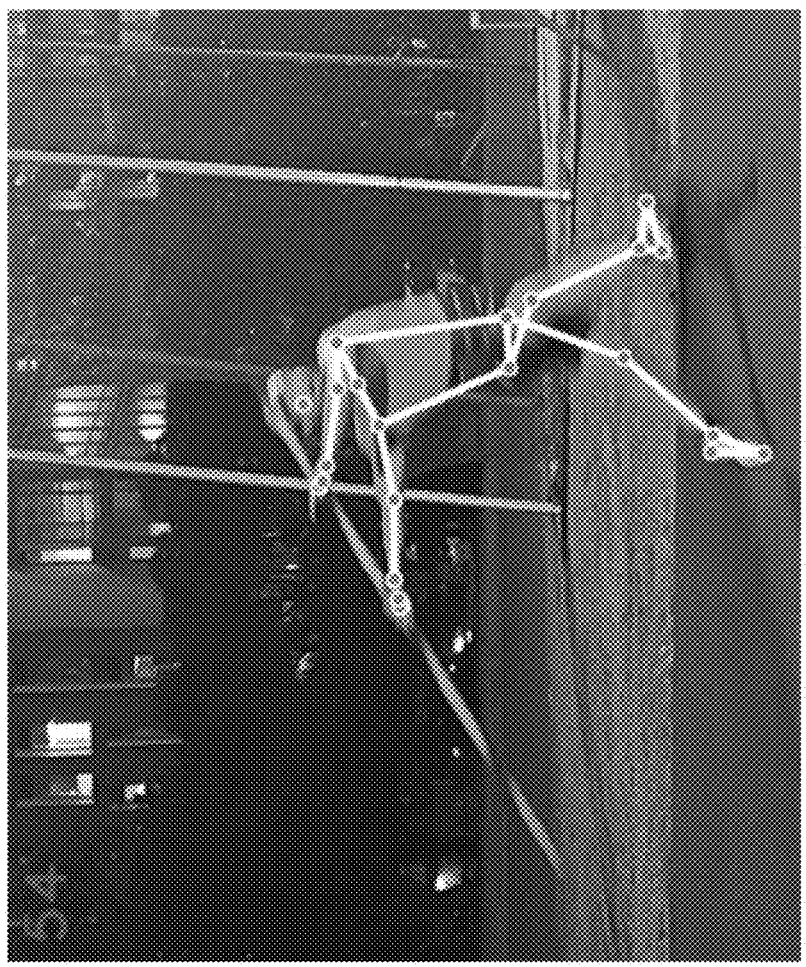
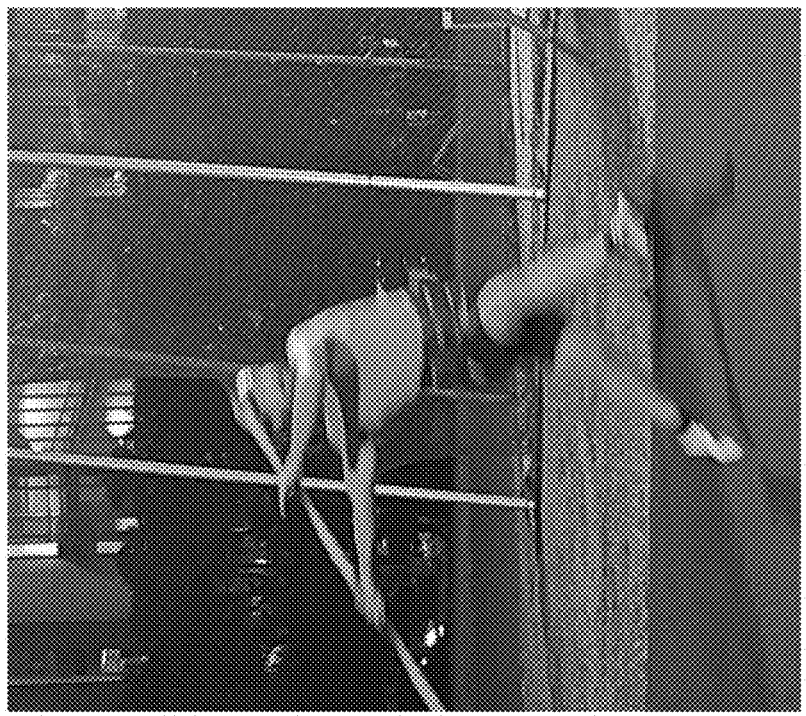
Figure 9: Combining the Cleaned Pose Data with Videos

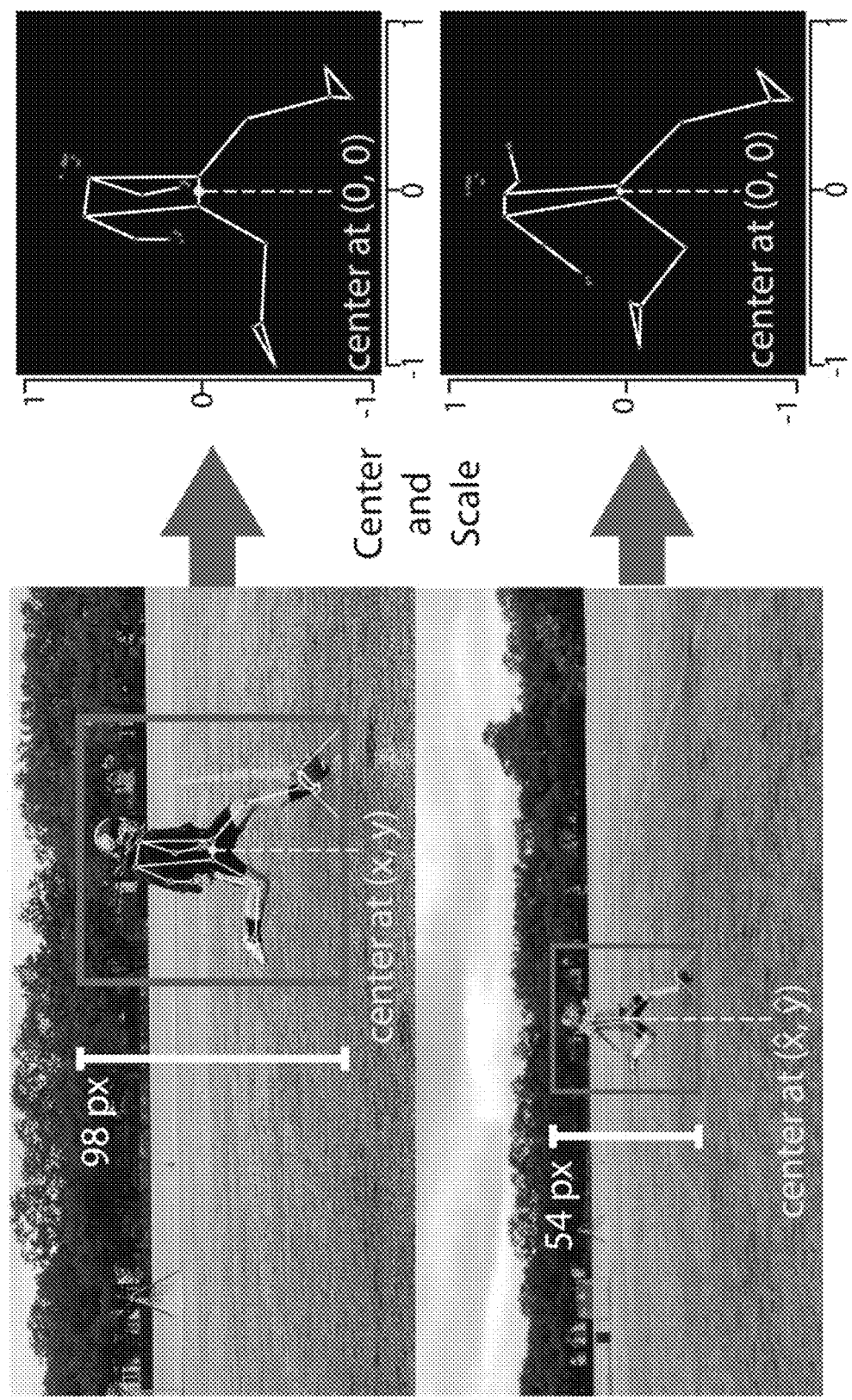
Figure 10: Scaling and Centering Using Bounding Boxes

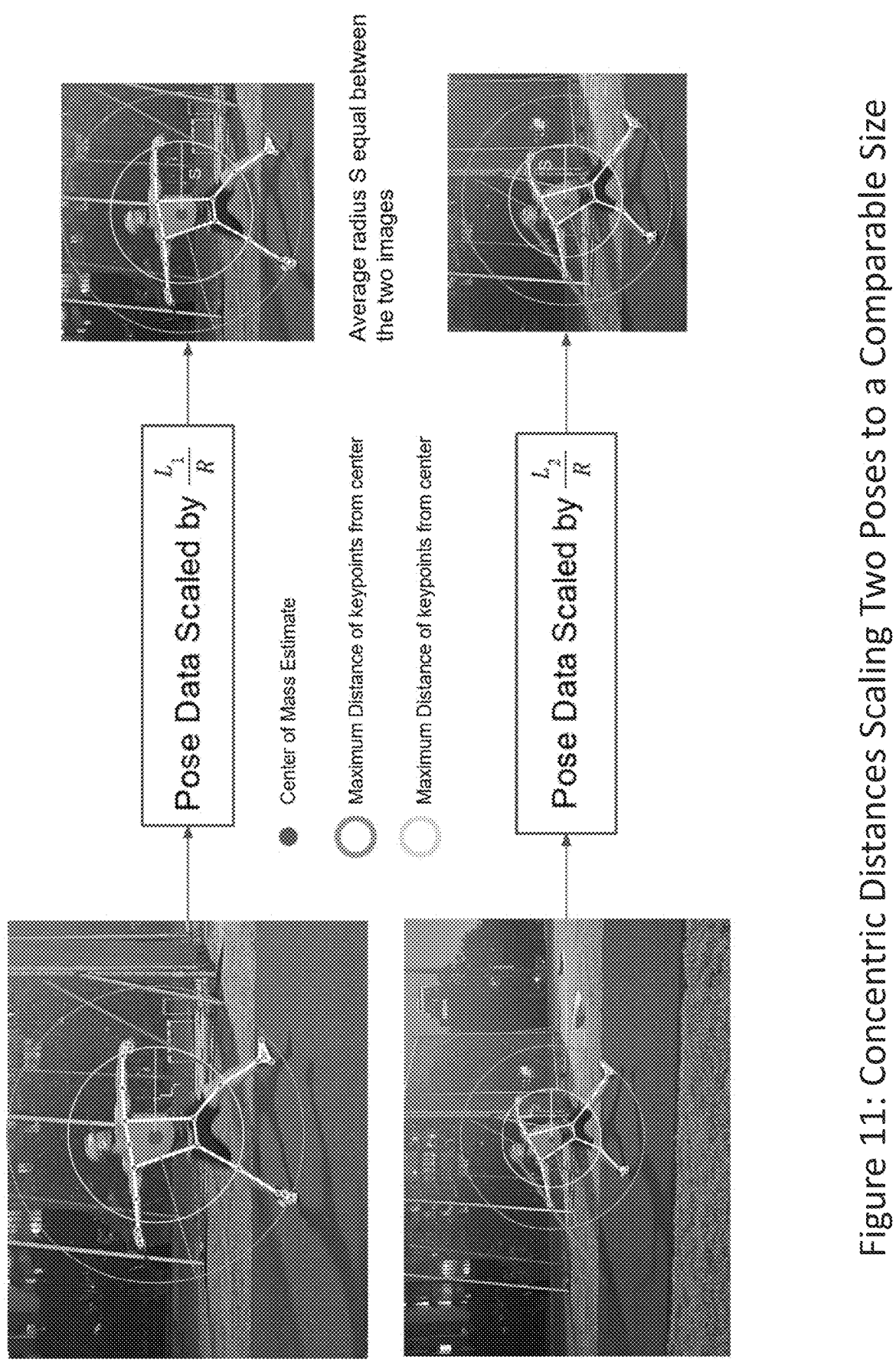
Figure 11: Concentric Distances Scaling Two Poses to a Comparable Size

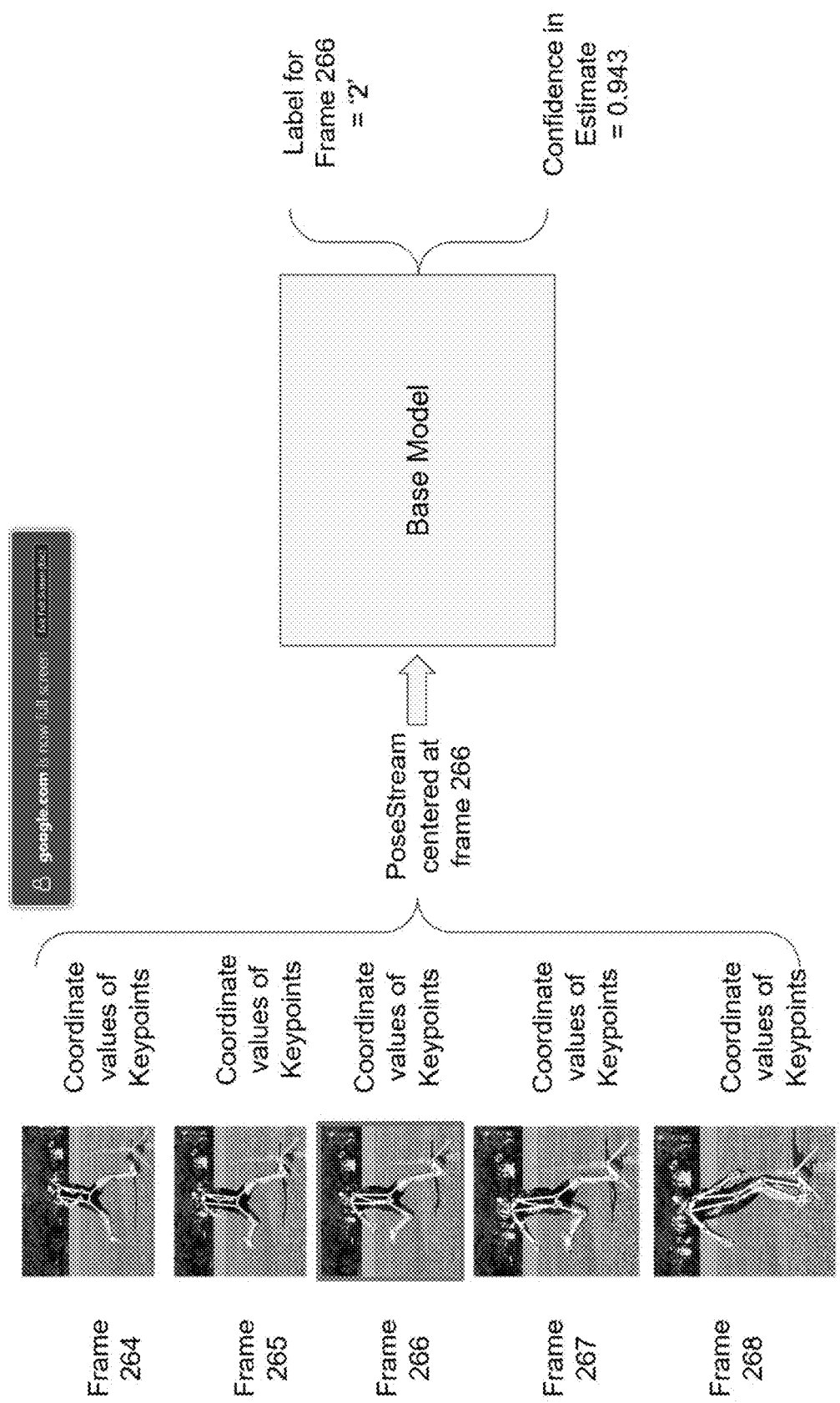
Figure 12: Base Model Data Flow

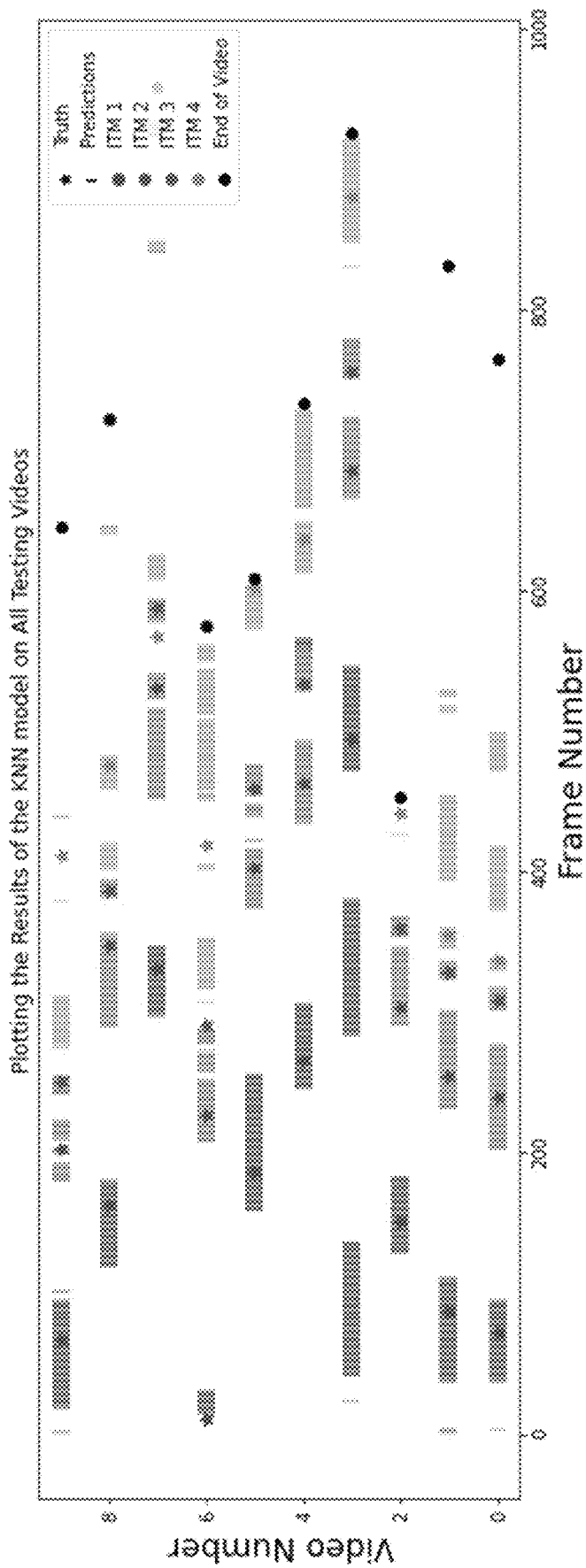
Figure 13: ITM Frame Classification Streams

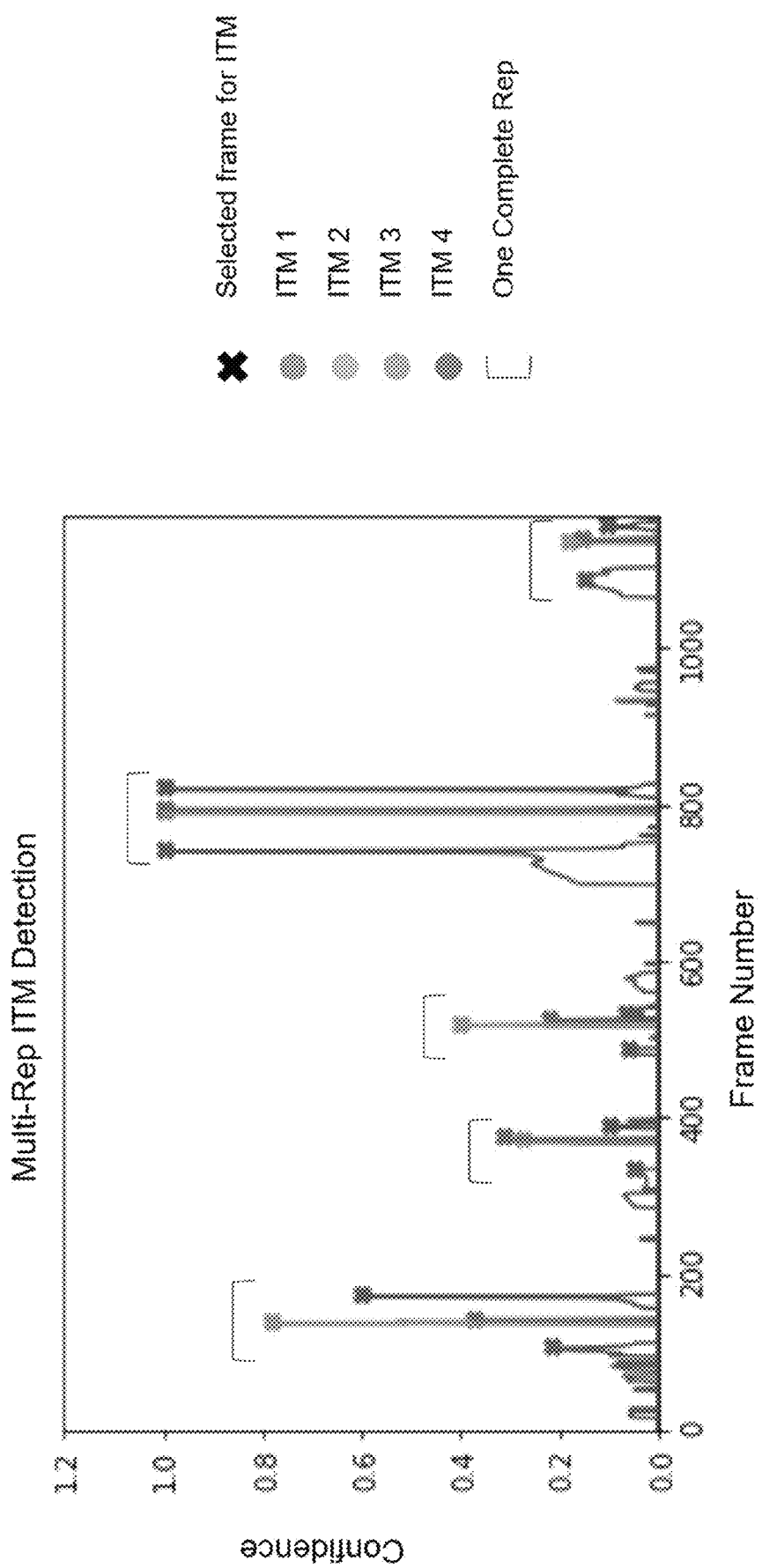
Figure 14: Example of Five Reps Being Identified

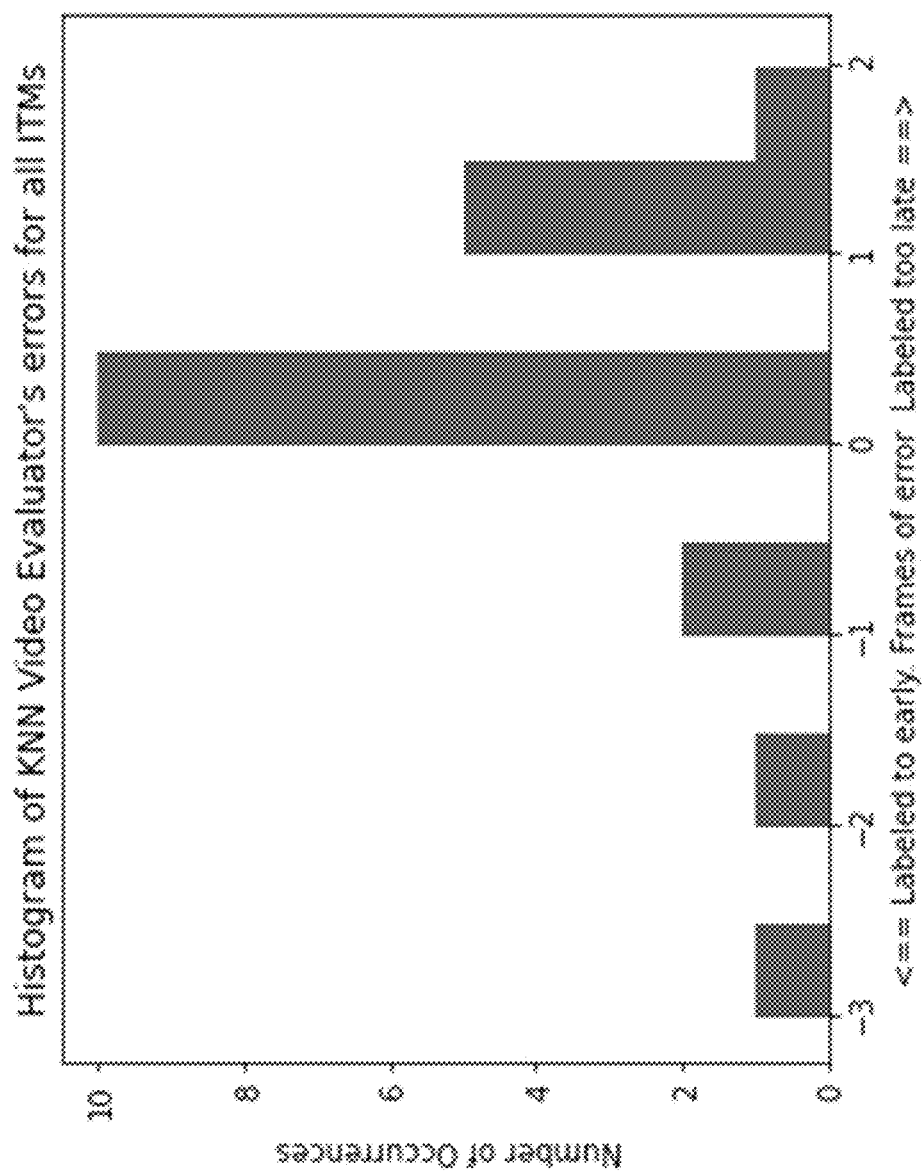
Figure 15: Histogram of Video Evaluator Accuracy

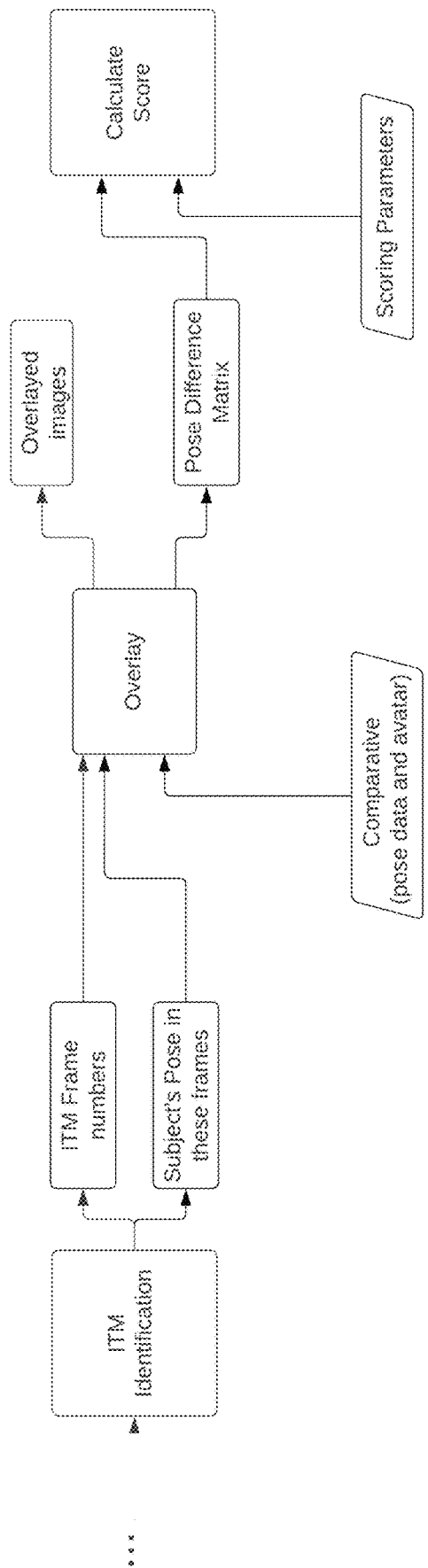
Figure 16: ITM Identification to Comparative Score

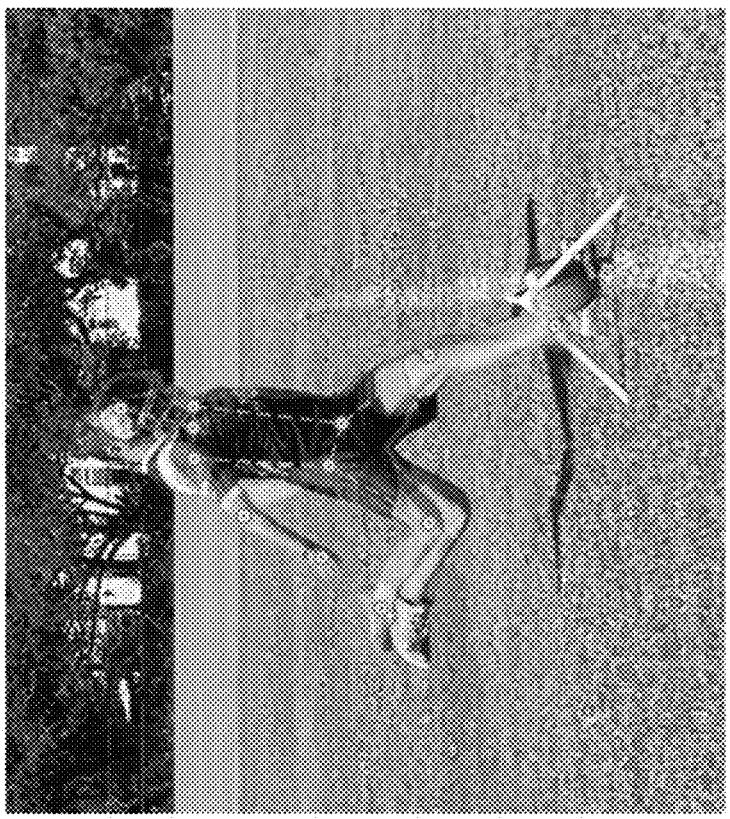
Figure 17: Two Examples of an Overlay

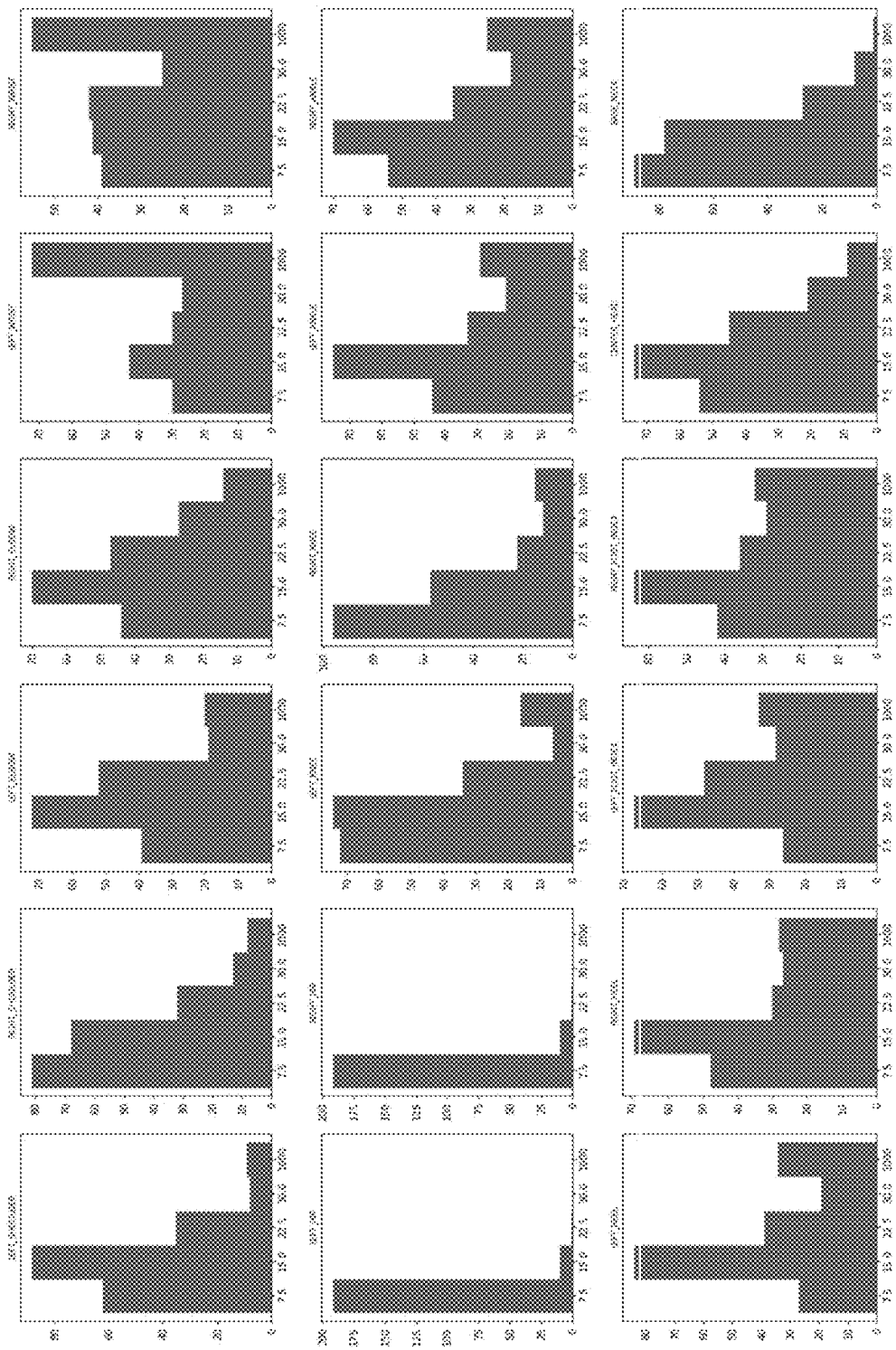
Figure 18: Analysis of Joint Difference Categorization

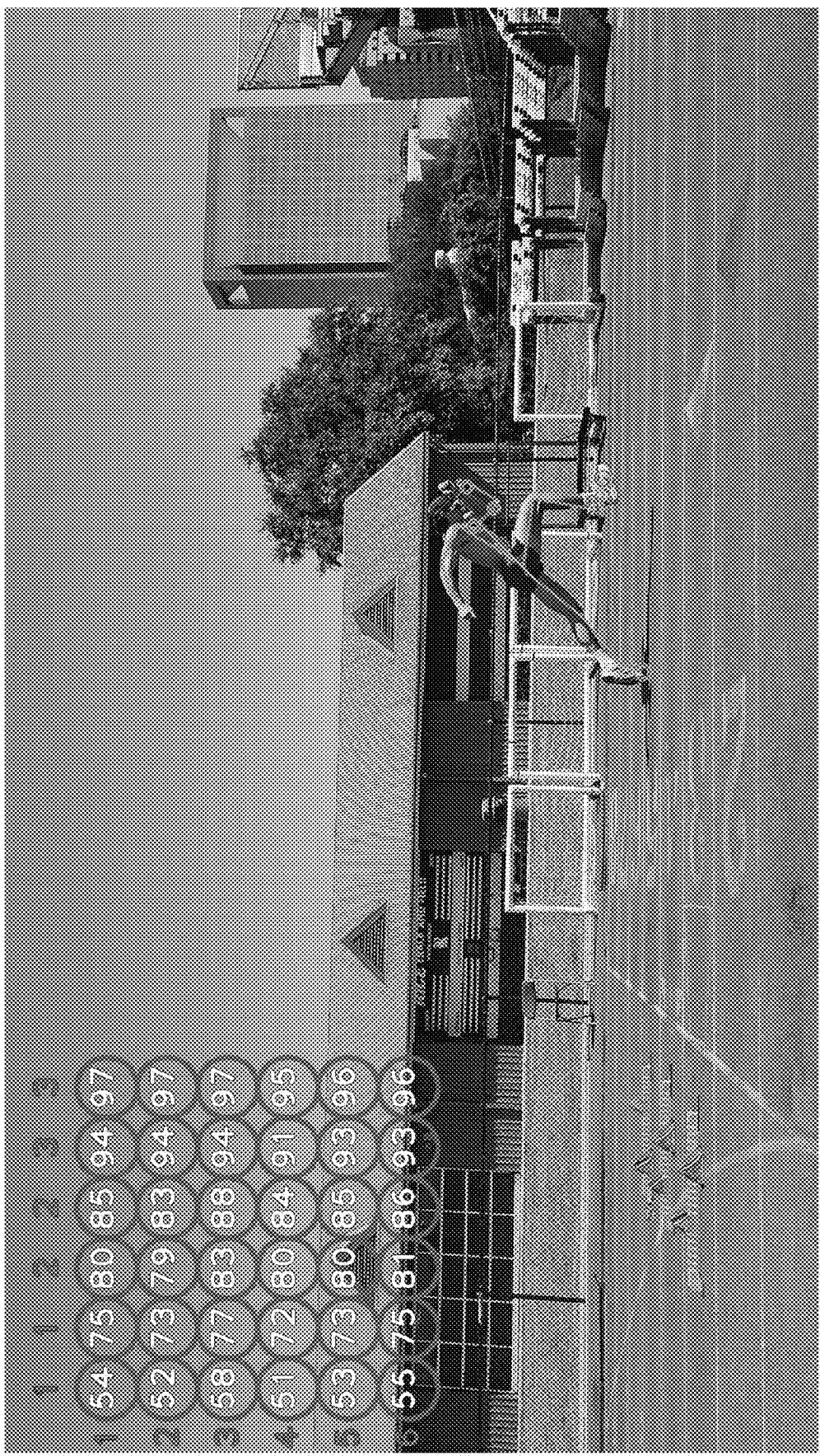
Figure 19: 36 Different Scoring Combinations

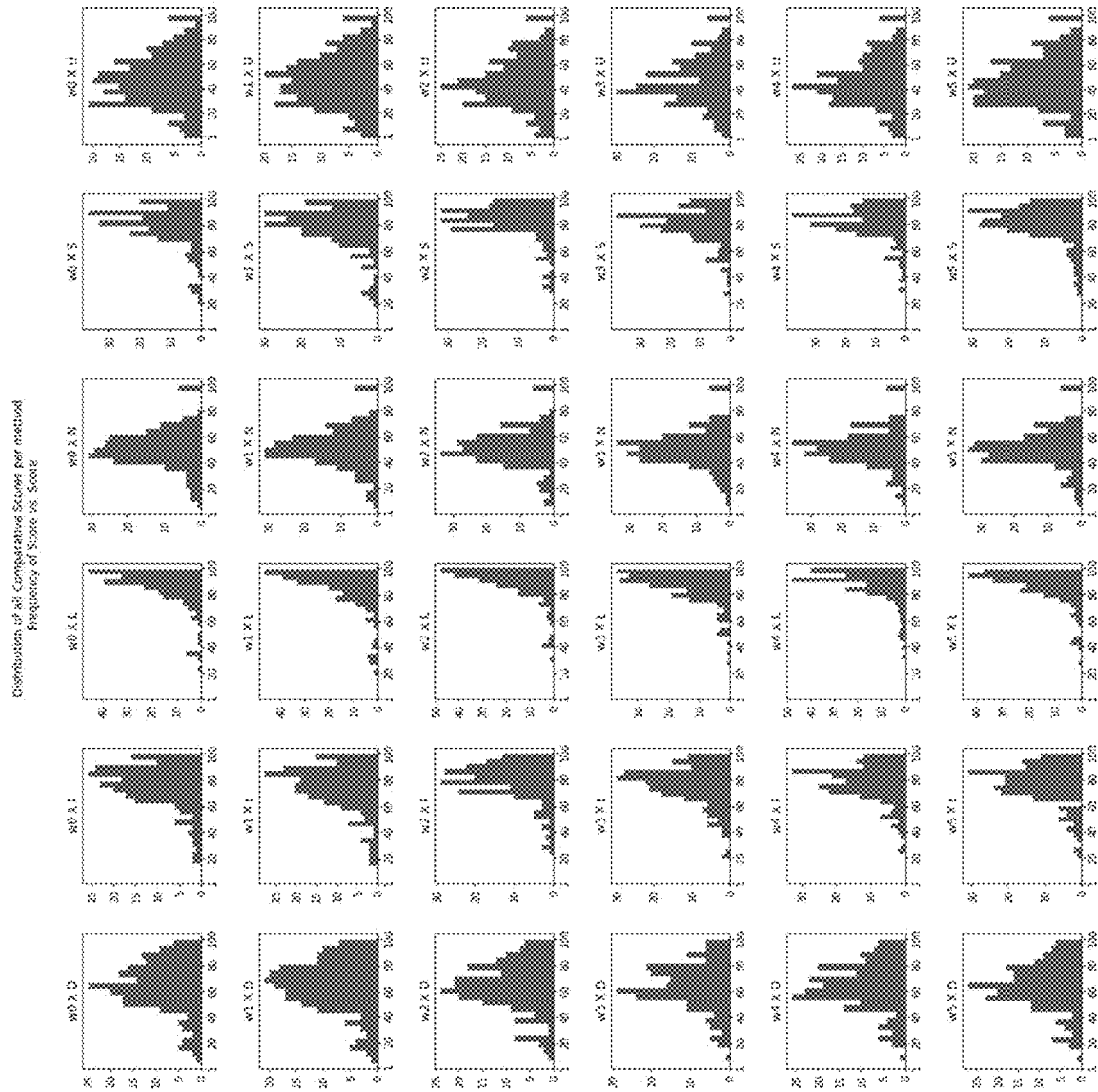
Figure 20: Score Distribution based on Scoring Methodology Combinations

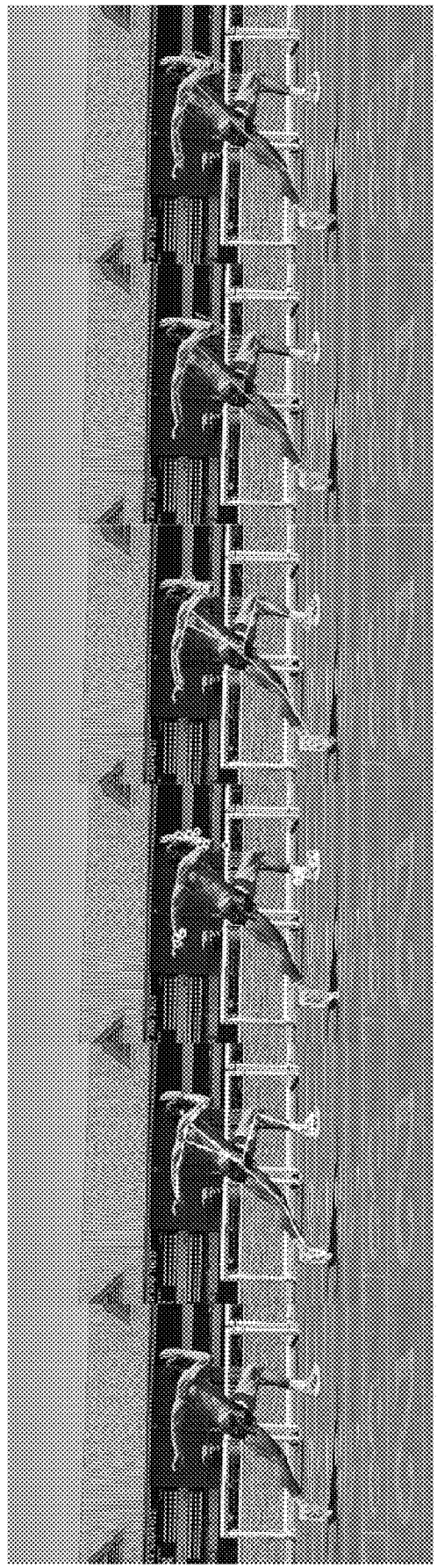
Figure 21: Flow from Image to Analysis

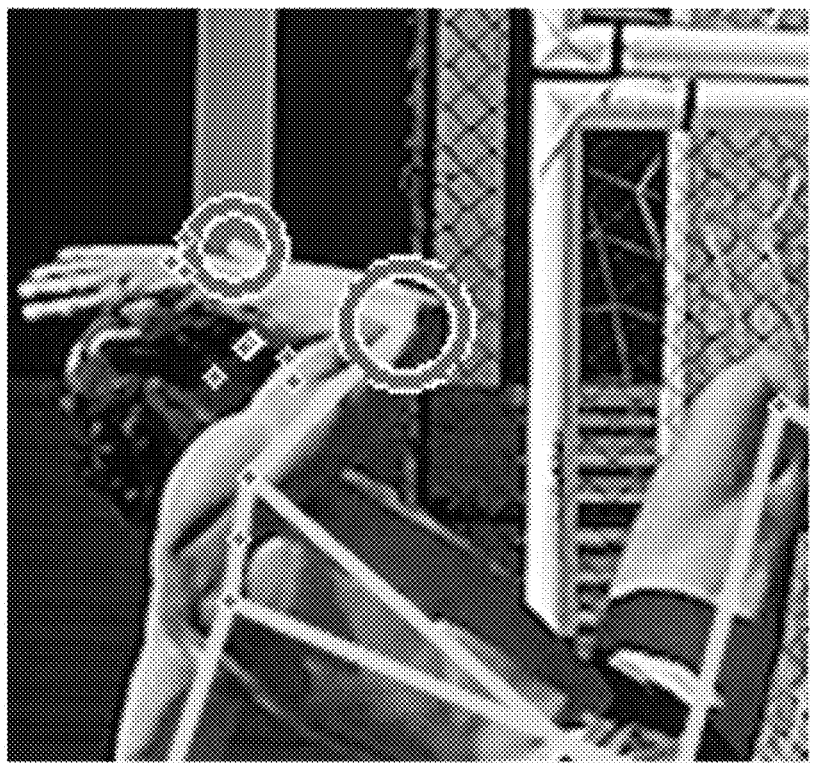
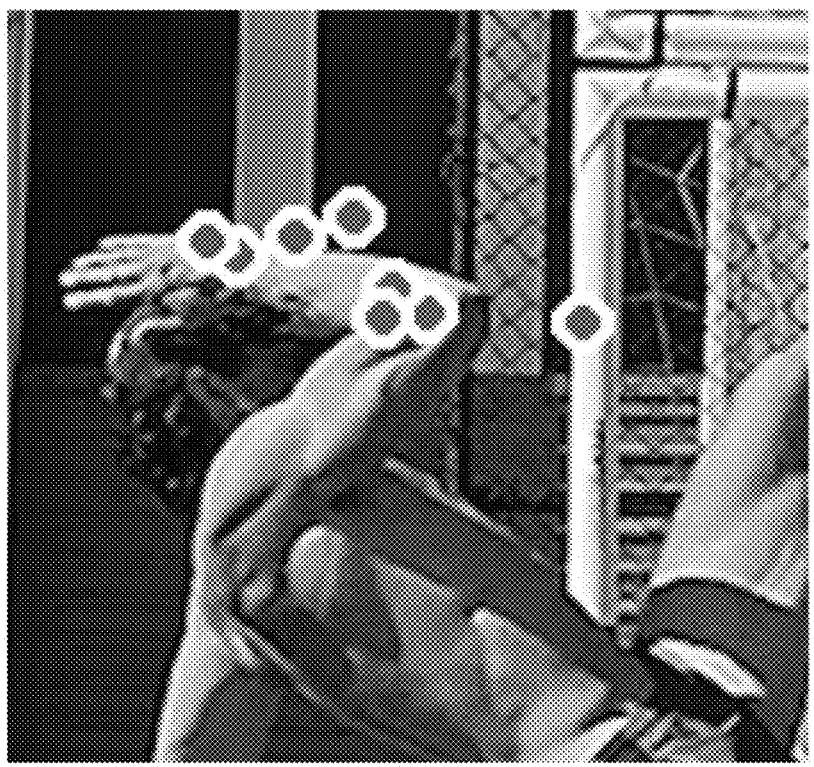
Figure 22: Variance of Joints Across Reps Captured in Size of Blue Ring

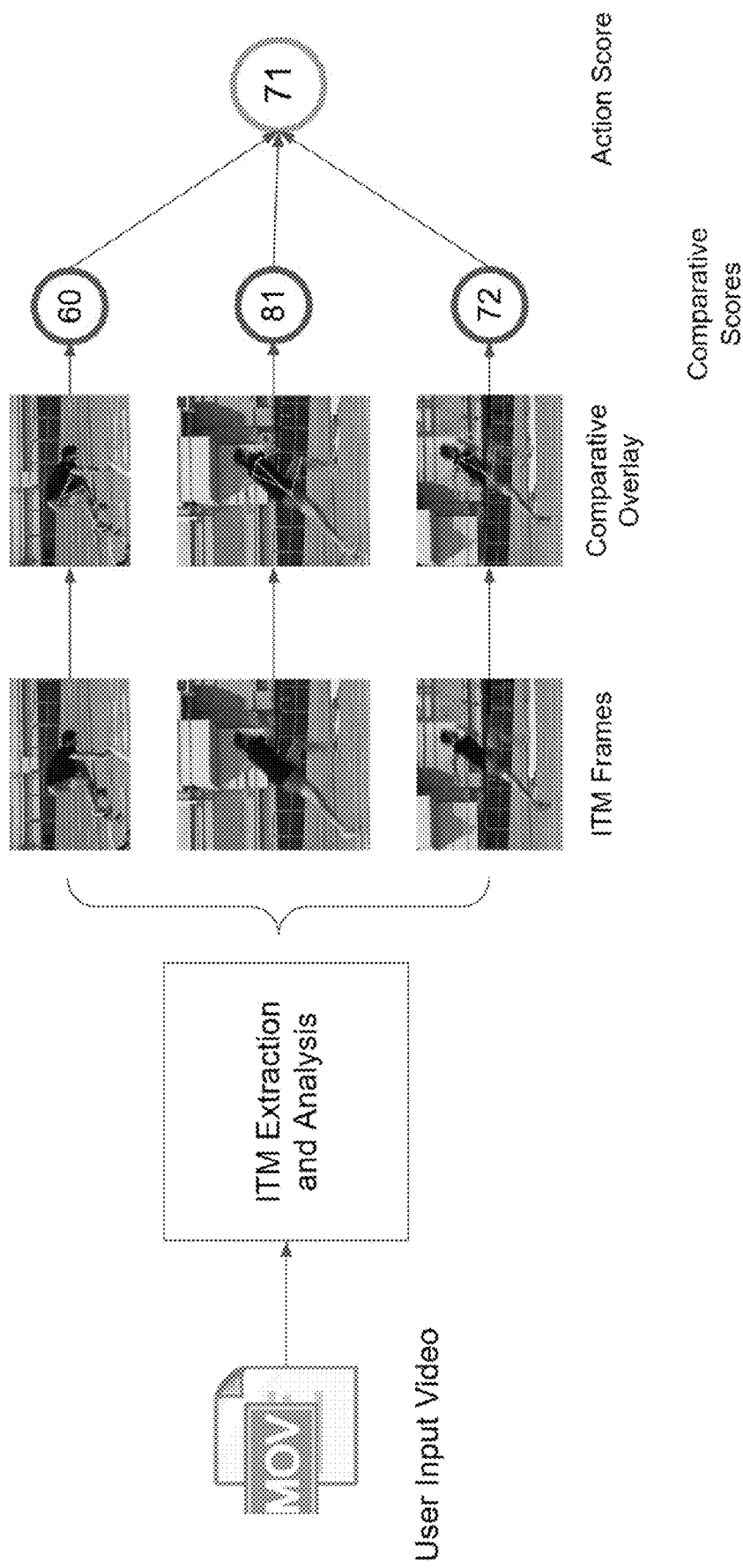
Figure 23: User Input to Output

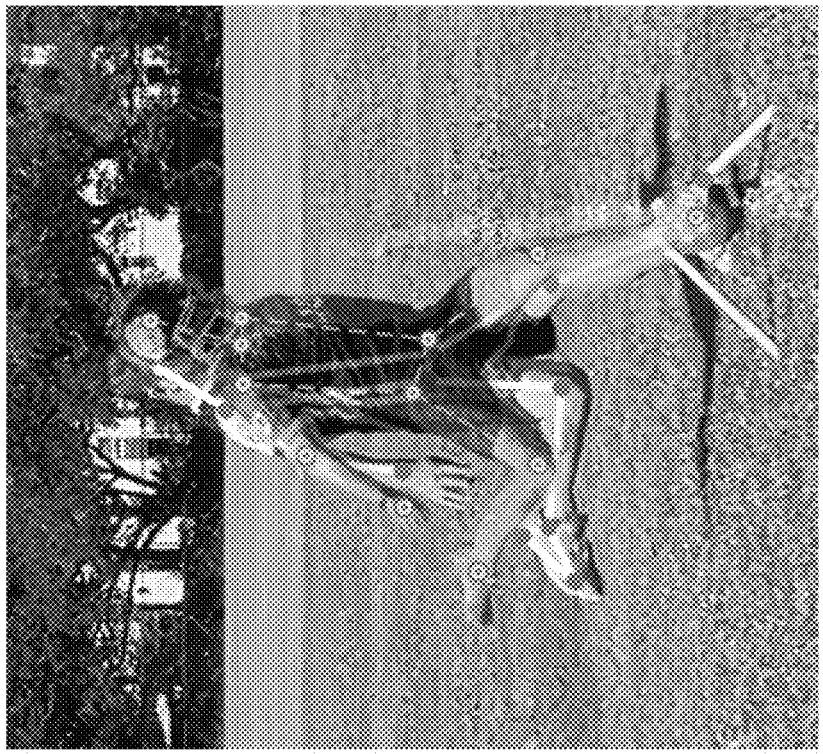
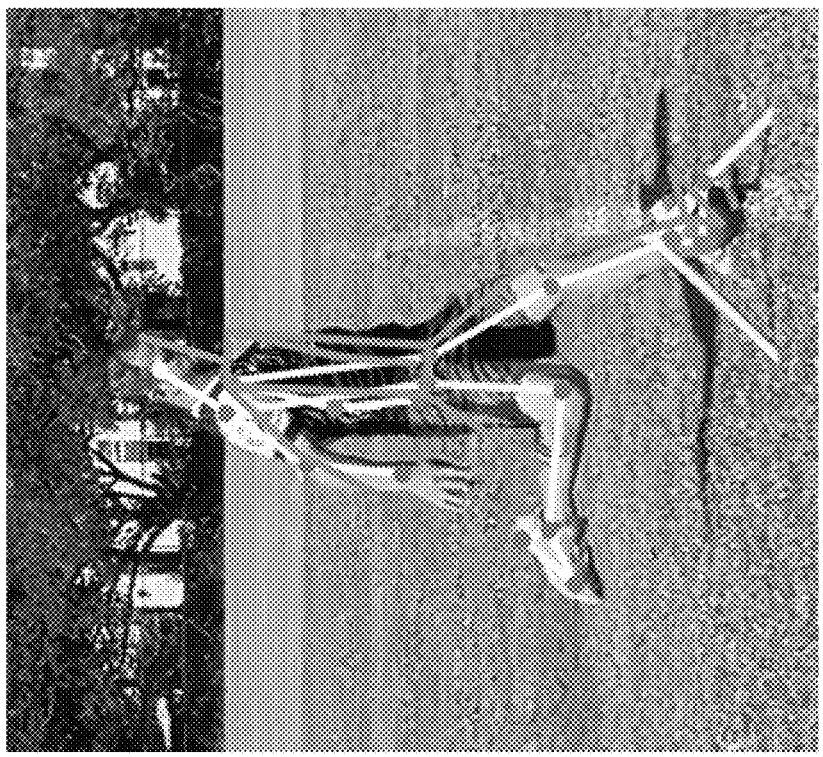
Figure 24

ATHLETIC PERFORMANCE ANALYSIS AND TRAINING SYSTEM AND METHOD

CROSS-REFERENCE TO RELATED APPLICATIONS

This application is a claims priority to U.S. Provisional Patent Application Ser. No. 63/302,311, filed Jan. 24, 2022, the entirety of which is incorporated by reference as if fully disclosed herein.

BACKGROUND OF THE INVENTION

I. Field of the Invention

The disclosure generally relates to athletic performance. More specifically, the disclosure relates to athletic analysis of performance and training for improvement.

II. General Background

Athletic performance analysis is typically based on statistical metrics and/or visual assessment based on experience or knowledge. The external metrics are used to compare athletes. For examples in USA football, a kicker is assessed on the amount of time the football is in the air (hangtime), placement of the football to land on the football field (distance), percentage of field goals compared to attempts at given distance from the field goal, and other statistical metrics. A coach, recruiter, or former player looking at an athlete and their playing ability can add a subjective assessment on overall style and capability. Individual coaching and training of the athlete can add subjective comments that can vary from coach to coach. Videos sometime taken of an athlete can also provide input. The statistical metrics provide incentive for the athlete to perform better but not the training on how to do so. The subjective assessment and individualized training vary and are often at odds with different opinions on style and different recommendations for training improvement. Verbal assessment at the time of practice can be immediate. Videos can later be assessed and opinions offered for the next practice. Further, availability of such training is greatest for professional athletes, less for collegiate athletes, even less for high school and intermediate school athletes, and often parents and friends for younger athletes. For communities, cultures, and countries with less resources, the disparity in training availability is even greater. What is needed is a system capable of less subjective, more accurate, recorded and recallable, detailed athletic analysis that can direct training, and provide insight to capability that is more accessible by a broad spectrum of athletes and coaches.

SUMMARY OF THE INVENTION

In accordance with embodiments of the invention, a computer-implemented method of performing, by a system of analyzing and training athletic performance implemented on one or more processors and associated memory, is provided. The method includes a first step of capturing a series of images of an individual performing an isolated athletic action. The method includes a second step of stabilizing said series of images wherein said individual performing said athletic action in each image of the series of images appears similar in size. The method includes a third step of recognizing the isolated athletic action from the series of images performed by the individual. The method includes a fourth step of identifying input training markers of the isolated athletic action in the series of images. The method includes a fifth step of smoothing the identified input training markers of the isolated athletic action in the series of images to identify and replace anomalies to create a feature curve or continuous estimate of the individual's movement between the images. The method includes a sixth step of generating a scaled overlay of a set of standardized performance indicators of input training markers on the series of images of the individual performing the isolated athletic action. The method includes a seventh step of calculating a score of the individual's input training markers of the isolated athletic action relative to the set of standardized performance indicators of input training markers.

In accordance with embodiments of the invention, a computer-implemented method of performing, by a system of analyzing and training athletic performance implemented on one or more processors and associated memory, is provided. The method includes a first step of capturing a series of images of an individual performing an isolated athletic action. The method includes a second step of recognizing the isolated athletic action from the series of images performed by the individual. The method includes a third step of identifying input training markers of the isolated athletic action in the series of images. The method includes a fourth step of generating a scaled overlay of a set of standardized performance indicators of input training markers on the series of images of the individual performing the isolated athletic action. The method includes a fifth step of calculating a score of the individual's input training markers of the isolated athletic action relative to the set of standardized performance indicators of input training markers.

In accordance with embodiments of the invention, a system including one or more computers that implement an athletic performance analysis training system, configured to perform, by a system of analyzing and training athletic performance, implemented on one or more processors and associated memory, is provided. The system is configured to receive a series of images of an individual performing an isolated athletic action. The system is configured to stabilize the series of images wherein the individual performing the athletic action in each image of the series of images appears similar in size. The system is configured to recognize the isolated athletic action from the series of images performed by the individual. The system is configured to identify input training markers of the isolated athletic action in the series of images. The system is configured to smooth the identified input training markers of the isolated athletic action in the series of images to identify and replace anomalies to create a feature curve or continuous estimate of the individual's movement between the images. The system is configured to generate a scaled overlay of a set of standardized performance indicators of input training markers on the series of images of the individual performing the isolated athletic action. The system is configured to calculate a score of the individual's input training markers of the isolated athletic action relative to the set of standardized performance indicators of input training markers.

Embodiments of the invention include a portable system and method of systematically analyzing athletic performance via standardized sets of physical action metrics. The standardized set of physical action metrics is based on "input training markers" at different positions of the body through actions conducted by the athlete in performing their sport. Individual positions of the athlete are measured, calculated and rated for focused improvement instruction. Additionally, with standard sets of input training markers and assessment, athletes can be provided a score that can be compared with other athletes in different communities, cultures, and countries for recruiting and unique, off-field competition. The present disclosure provides a methodology to systematize comparative analysis between a subject and a proxy, providing advanced athletic training to anyone with access to the invention. The present disclosure provides visual and calculated comparative analysis, defined by the margin of difference of body positions at input training markers and are described as "training margins."

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing and other objects, features, and advantages of the invention are apparent from the following detailed description taken in conjunction with the accompanying drawings in which like parts are given like reference numerals and, wherein:

FIG. 5 is an example of the mathematic step in FIG. 2 of correlating significance of an input training marker to a desired outcome for the example in FIG. 3.

FIG. 8A depicts the first part of a flow chart illustrating a method of training a machine learning model to detect IAA and ITM and use in athletic training in accordance with embodiments of the invention.

FIG. 8B depicts the continuation of a flow chart illustrating a method of training a machine learning model to detect IAA and ITM and use in athletic training in accordance with embodiments of the invention.

FIG. 9 depicts a side by side comparison of an athlete throwing a javelin and the same image with a wireframe keypoint overlay imposed over the athlete in accordance with embodiments of the invention.

FIG. 10 depicts a side by side comparison of a method of scaling and centering two different athletes performing the same IAA in accordance with embodiments of the invention.

FIG. 11 depicts a side by side comparison of a method of scaling and centering two different athletes performing the same IAA in accordance with embodiments of the invention.

FIG. 12 depicts creation of a base model for use in training a machine learning models for use with athletic training in accordance with embodiments of the invention.

FIG. 13 depicts ITM classification streams for use in training machine learning models for use with athletic training in accordance with embodiments of the invention.

FIG. 14 is an example of the output based on the analysis of the athlete motion for a given IAA and the comparison to the ITMs of that IAA in accordance with embodiments of the invention.

FIG. 15 is an example of a histogram of video editor accuracy in accordance with embodiments of the invention.

FIG. 16 is a flow chart illustrating a method of ITM identification to comparative score in accordance with embodiments of the invention.

FIG. 17 is a side by side comparison showing a wire frame of a standardized performance indicator overlay on an image of an athlete and a wireframe keypoint overlay showing the athlete's own keypoint in accordance with embodiments of the invention.

FIG. 18A shows a series of histograms describing the frequency that a given joint falls into the five categories across multiple videos in accordance with embodiments of the invention.

FIG. 18B shows an additional series of histograms describing the frequency that a given joint falls into the five categories across multiple videos in accordance with embodiments of the invention.

FIG. 19 shows an example of one ITM frame analyzing 6 different categorization methods with 6 different Importance Vectors in accordance with embodiments of the invention.

FIG. 20A shows how the scores of actions are distributed for different scoring combinations in accordance with embodiments of the invention.

FIG. 20B shows how the scores of additional actions are distributed for different scoring combinations in accordance with embodiments of the invention.

FIG. 20C shows how the scores of additional actions are distributed for different scoring combinations in accordance with embodiments of the invention.

FIG. 21 shows how the pose data of an athlete performing the same IAA five times is extracted so ITM Frames can be used for feedback and analysis in accordance with embodiments of the invention.

FIG. 22 shows how two joints (the left elbow and wrist) with the most variance can be mapped to rings to illustrate a variance with a standard performance indicator in accordance with embodiments of the invention.

FIG. 23 shows the flow of a general use case of an embodiment of the invention by a user.

FIG. 24 is a side by side comparison showing a wire frame of a standardized performance indicator overlay on an image of an athlete with a wireframe keypoint overlay showing the comparative difference in accordance with embodiments of the invention.

Figure 1:
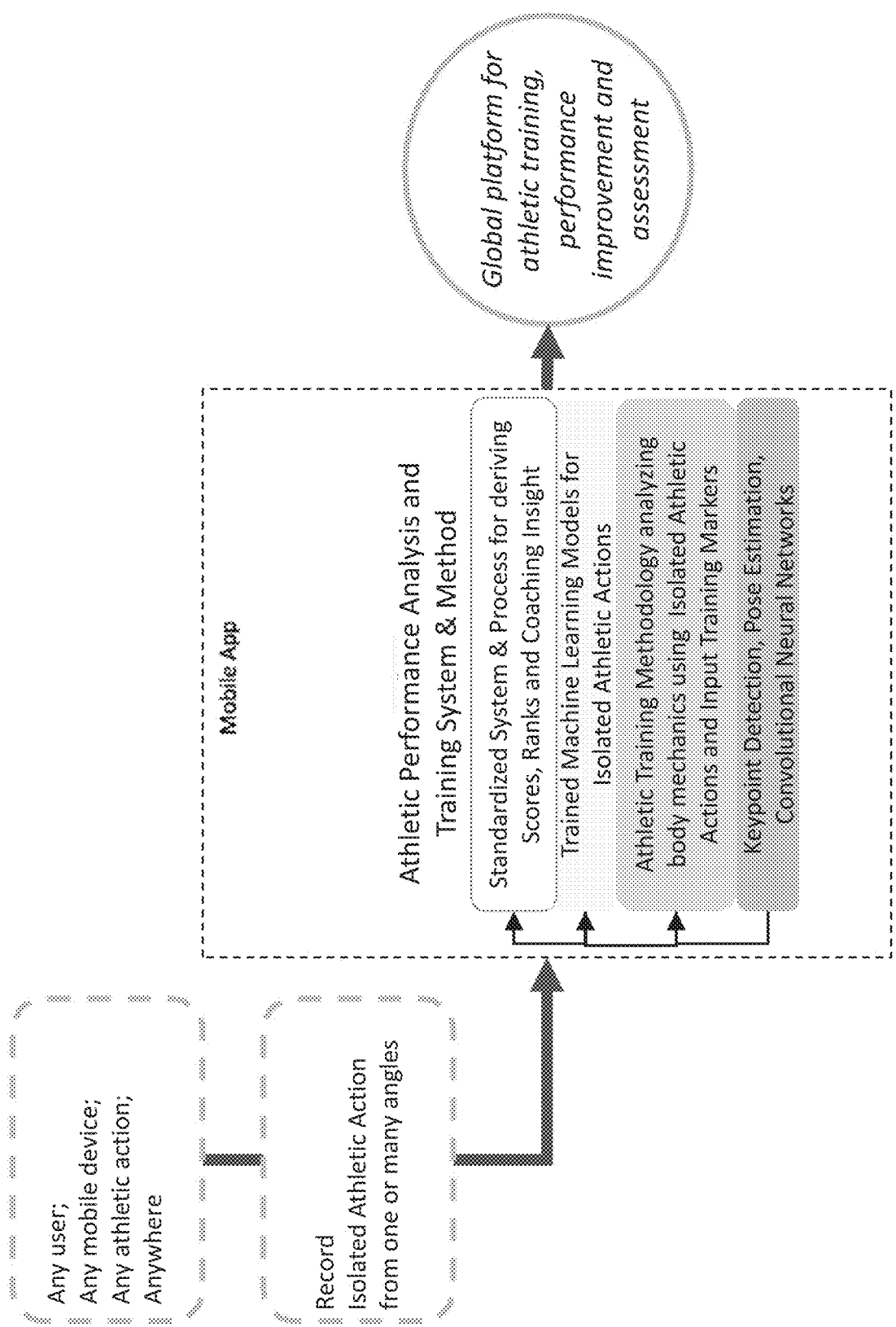
FIG. 1 depicts a flow chart illustrating a method in accordance with embodiments of the invention.

The images in the drawings are simplified for illustrative purposes and are not depicted to scale. Within the descriptions of the figures, similar elements are provided similar names and reference numerals as those of the previous figure(s). The specific numerals assigned to the elements are provided solely to aid in the description and are not meant to imply any limitations (structural or functional) on the invention.

The appended drawings illustrate exemplary configurations of the invention and, as such, should not be considered as limiting the scope of the invention that may admit to other equally effective configurations. It is contemplated that features of one configuration may be beneficially incorporated in other configurations without further recitation.

DETAILED DESCRIPTION

The embodiments of the disclosure will be best understood by reference to the drawings, wherein like parts are designated by like numerals throughout. It will be readily understood that the components, as generally described and illustrated in the Figures herein, could be arranged and designed in a wide variety of different configurations or be entirely separate. Thus, the following more detailed description of the embodiments of the system and method of the disclosure, as represented in the Figures is not intended to limit the scope of the disclosure, as claimed, but is merely representative of possible embodiments of the disclosure.

In accordance with embodiments of the invention, as illustrated in FIGS. 1-27, a computer-implemented method of performing, by a system of analyzing and training athletic performance implemented on one or more processors and associated memory, is provided. The method includes a first step of capturing a series of images of an individual performing an isolated athletic action. The method includes a second step of stabilizing said series of images wherein said individual performing said athletic action in each image of the series of images appears similar in size. The method includes a third step of recognizing the isolated athletic action from the series of images performed by the individual. The method includes a fourth step of identifying input training markers of the isolated athletic action in the series of images. The method includes a fifth step of smoothing the identified input training markers of the isolated athletic action in the series of images to identify and replace anomalies to create a feature curve or continuous estimate of the individual's movement between the images. The method includes a sixth step of generating a scaled overlay of a set of standardized performance indicators of input training markers on the series of images of the individual performing the isolated athletic action. The method includes a seventh step of calculating a score of the individual's input training markers of the isolated athletic action relative to the set of standardized performance indicators of input training markers.

The present disclosure provides a portable system and method of systematically analyzing athletic performance via standardized sets of physical action metrics. The standardized set of physical action metrics is based on "input training markers" at different positions of the body through actions conducted by the athlete in performing their sport. Individual positions of the athlete are measured, calculated, and rated for focused improvement instruction. Additionally, with standard sets of input training markers and assessment, athletes can be provided a score that can be compared with other athletes in different communities, cultures, and countries for recruiting and unique, off-field competition.

FIG. 1 is a diagram providing an overview of the present invention. In general, the invention provides on-field artificial intelligence, enhancing athletes and coaches to compete at an improved level. The system provides computer vision, machine learning using keypoint detection, and pose estimation for a given athletic action, such punting, kicking, throwing, jumping, swinging, lifting, running, twisting, flipping, bending, jousting, pushing, or any other athletic action (generally conducted with a given radius), herein referred to as an "isolated athletic action" or "IAA". For each isolated athletic action, the keypoint detection and pose estimation can be based on specific identified positions that can be used as standardized performance indicators for accessing and training for the given IAA. The performance indicators are herein referred to as "input training markers" or "ITMs" that can be standardized for a given IAA among the athletes using the invention. The ITMs can be important microactions within a given IAA that have correlations with a specific performance outcome. Devices capable of videos, including but not limited to mobile device cameras, digital cameras, professional videographic equipment, and other devices can record movement of the athlete through the selected isolated athletic action. Computer analysis of the recorded movement identifies video frames that show a position of the athlete at each input training marker and can automatically compare the athlete position to a comparative position at the ITM. The variance from the comparative position is identified, given a value, and can be pictorially and quantifiably provided for guiding the athlete for corrective positioning and improvement for that ITM which ultimately improves performance for the IAA. The system can predict which ITM will maximize athletic performance and inform individual tailored performance training. One or more cameras can be used for one or more angles of the IAA. The analysis can be real time during a practice or competition to assist the athlete at that time with immediate specifically tailored focus. In at least one embodiment, the athletic performance data can be collected, assigned, and calculated into ITM scores and ranks. For example, embodiments of the invention will store a database of standardized performance indicators for isolated athletic actions for use by athletes in a comparison. Thus, an athlete will be able to use a computing device, such as a mobile phone or a table, open a software application containing software instructions to execute the method disclosed herein, and receive real time feedback on an athletic action. An athlete in training may look to a well-established athlete or a more correct way of performing an action and receive immediate, visual feedback showing the athlete's performance compared to the motions expected of a more correct performance. The athlete can then work to refine their own movements.

The comparative positions used for scoring the athlete performance can be from data that has been previously populated into the system. The comparative positions can be derived from generally well known athletes who have excelled in their field. Such comparative athletes have been measured for two and three-dimensional pose estimation and physio-anatomical measurements and their motions for their one or more relevant IAAs have been videoed, analyzed, recorded and can be recallable in the invention. The subject athlete to be analyzed can be measured for two and/or three-dimensional pose estimation and physio-anatomical measurements. Based on the subject athlete parameters, the system can correlate and recommend comparative athletes to model against and provide analyses for assessment and corrective recommendations for individual improvement.

In at least one embodiment, the participation of the comparative athlete can be encouraged by providing compensation to the comparative athlete when the subject athlete chooses that comparative athlete for the comparative analysis in the invention. The comparative athlete may also find satisfaction in being able to be chosen from others around the world for analysis and training improvement to those who would never have such an opportunity.

In at least one embodiment, the system uses machine learning and computer vision with convolutional neural networks and deep learning models to identify two and/or three-dimensional pose estimation, physio-anatomical measurements as well as statistical modeling, and output correlation significance. The subject athlete video data and the comparative athlete video data is analyzed to understand the most significantly correlated actions at one or more ITMs to achieve a desired result. Further, the output can include predictive coaching output based on specific athlete generated independent actions and interpreting the data to provide individually designed athletic training. Without limitation, some technical features of the system include: (i) Identifying keypoints in humans from videos, such as important joints in the body, anatomical positions, angles, azimuths, and so forth; (ii) Detecting and estimating significance of a specific pose of a human performing tasks, such as isolated athletic actions ("IAA"), using input training markers ("ITM") to understand the probability of a favorable outcome and/or performance improvement; (iii) Utilizing deep learning models to predict whether favorable outcomes can be achieved by an action in a particular sport (such as kicking a football between upright goal posts from a distance); and (iv) Interpreting developed models for pose estimation to identify patterns that result in favorable outcomes.

The system can be portable with downloadable software, such as in the form of a mobile application, for the use of specific sports training and coaching. The system can use advanced video analysis, computer vision and data visualizations for the identified IAA.

Figure 2:
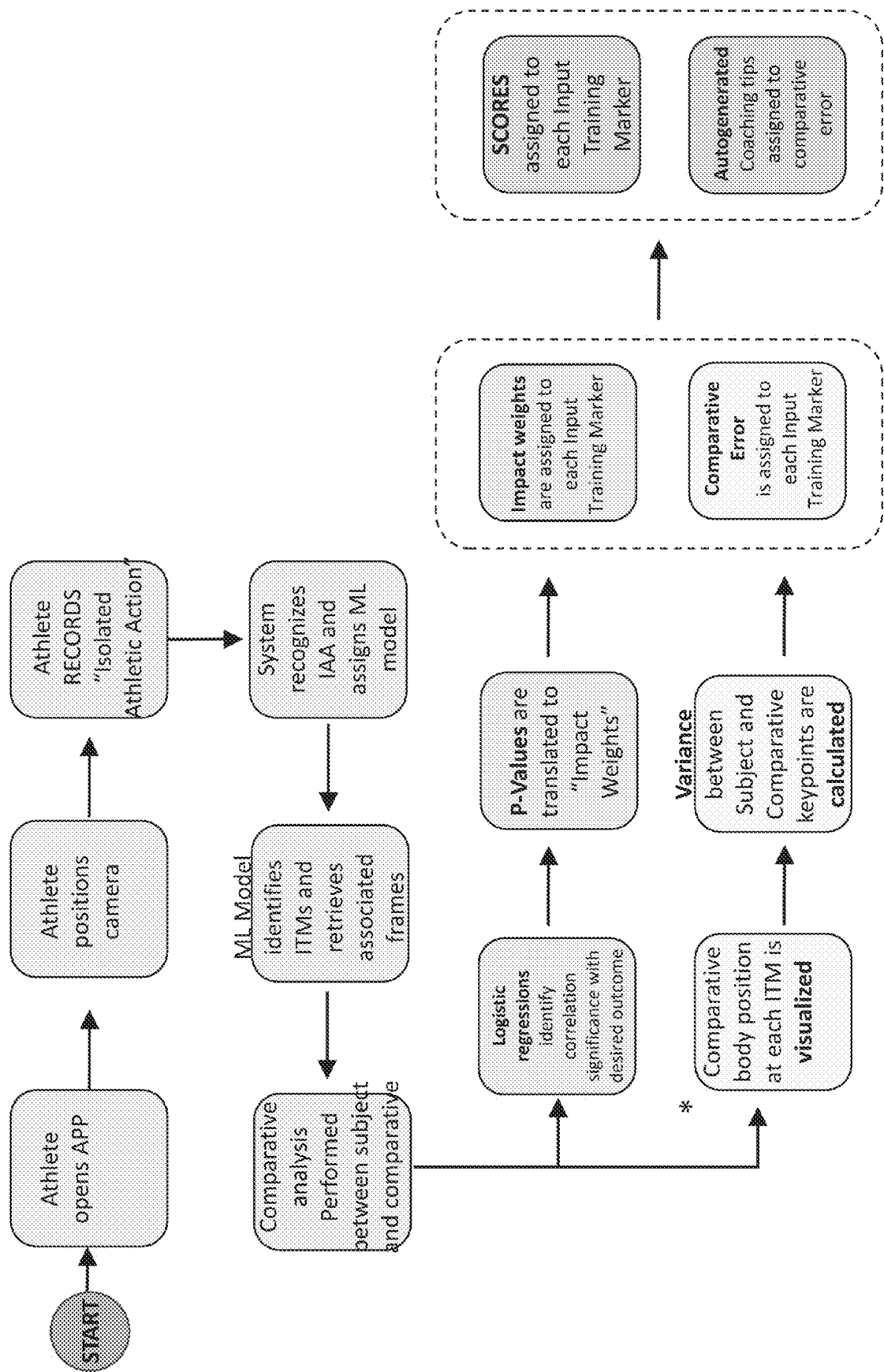
FIG. 2 depicts a flow chart illustrating a method in accordance with embodiments of the invention.

FIG. 2 is a flow chart of the system and associated method. Some portions are illustrated with subsequent figures. In general, the system is activated on site, the athlete can be scanned by the system, or otherwise data input into the system, for two and/or three-dimensional pose estimation, physio-anatomical measurements, and any other relevant attribute. The athlete performs the IAA while being videoed, and the system analyzes the video with specific ITMs assigned to specific frames in the video. Previously or in real time with the athlete, the system can electronically compute correlate a significance of certain actions with a desired outcome and establish weights based on the correlation. The weights can be assigned to each ITM. The athlete's body motion can be assessed against a comparative body motion, specifically at each ITM, and a training margin to the comparative position be assigned to each ITM. The weight and the training margin can converge to determine scores for each ITM of that event.

Figure 3:
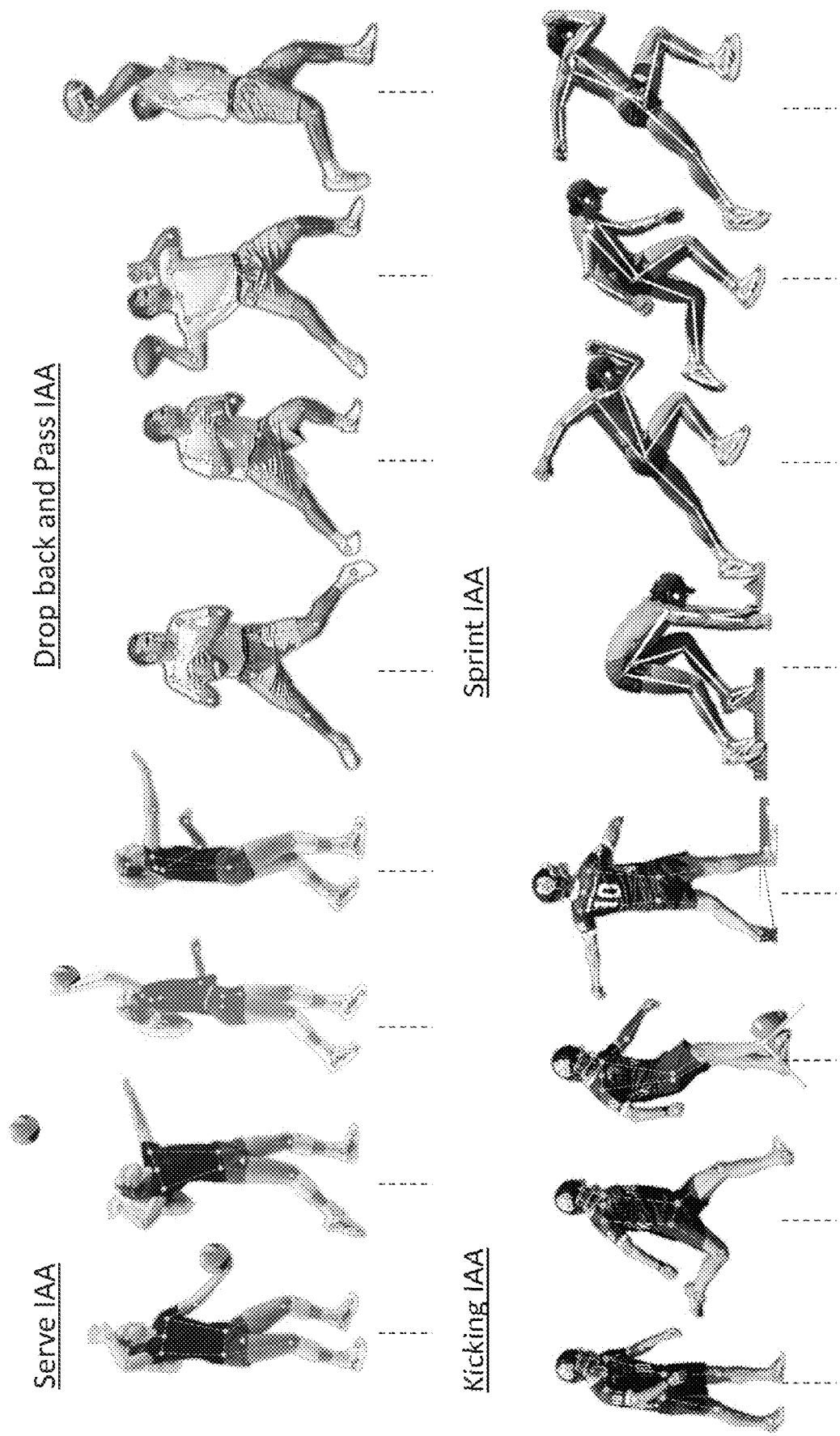
FIG. 3 depicts examples of sequences of poses of isolated athletic actions (IAA) and the related input training markers (ITM) for a volleyball serve, a quarterback pass, a football kick, and a running sprint in accordance with embodiments of the invention.

FIG. 3 is an example of an isolated athletic action and the related input training markers. The non-limiting example is punting a football. In this IAA, five ITMs are identified as catch and set, drop, extension, cockpit, and follow through. Other metrics can be used such as hangtime for the time the ball is in the air and distance from the kicker to the ball hitting the field or being caught by a player. Computer analysis of the video showing the athlete performance can correlate relevant frames at the ITMs and produce a statistical correlation to the comparative ITM position and ultimately the outcome. The process of marking ITMs can be applied to any human action. Users of the invention, including but not limited to coaches, can mark ITMs, making the selected ITMs an IAA ML model, the result of all coached in the platform.

Figure 4:
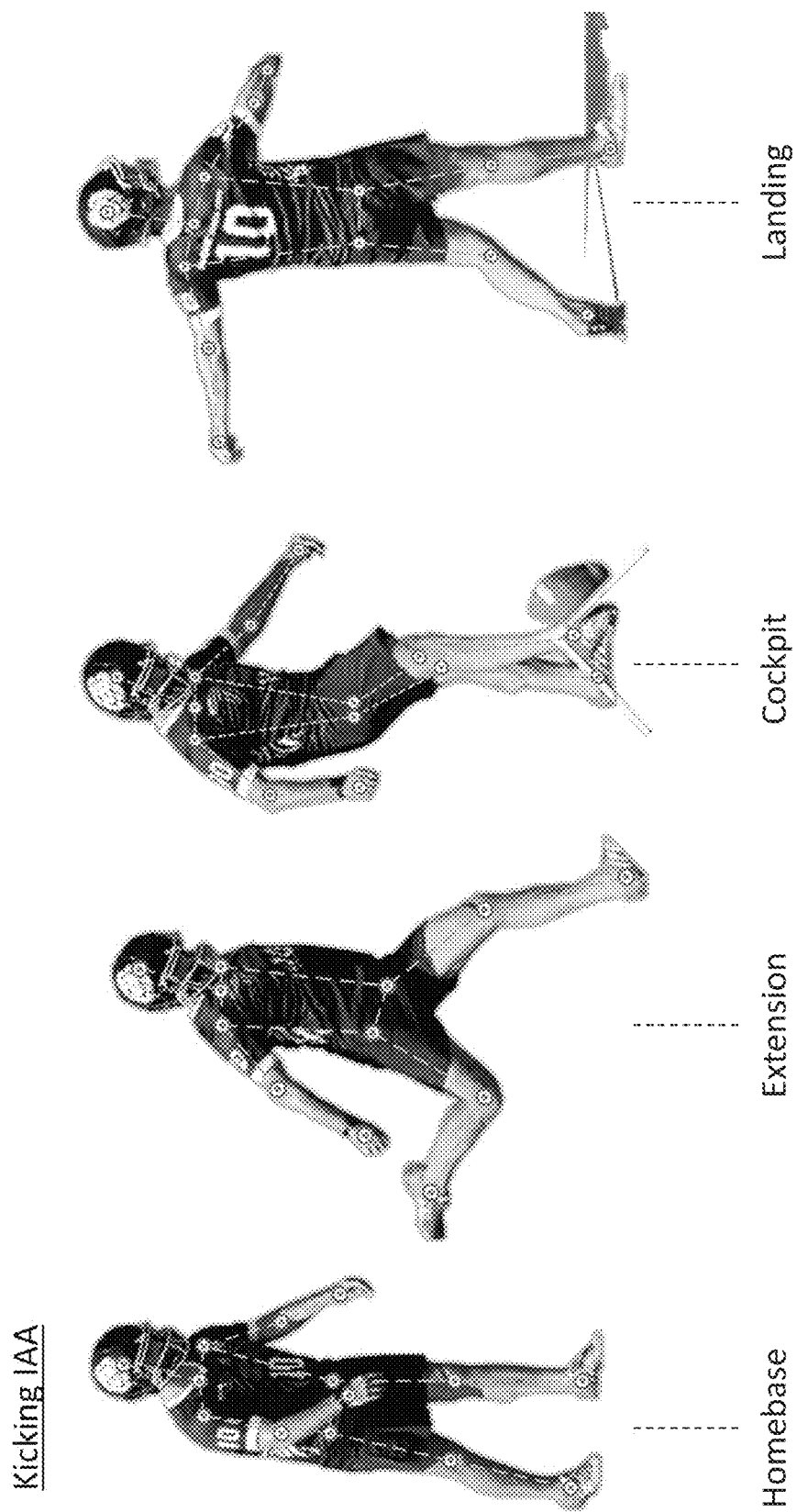
FIG. 4 depicts an example of a sequence of a pose of isolated athletic actions (IAA) and the related input training markers (ITM) for a football kick in accordance with embodiments of the invention.

FIG. 4 is another example of an isolated athletic action and related input training markers. The non-limiting example is kicking a football. In this IAA, four ITMs are identified as homebase, extension, cockpit, and landing; these can be standardized across every kick in the platform. The ML model for kicking is informed, trained and improved by every subsequent recorded kick in the platform.

FIG. 5 is an example of the mathematic step in FIG. 2 of correlating significance of an input training marker to a desired outcome for the example in FIG. 3. Mathematical analyses, such as and without limitation logistic regressions, can be used to determine the correlation significance on y-dependent variable=Favorable Action (ex. Kick). In this example, "Landing" and "Cockpit" have a p-value near zero, meaning they are the most significant impacts on a favorable outcome and "Homebase" is third. As more data is collected and added to the model, correlation significance can change over time. In a second example, impact on Y-dependent variable=Favorable Kick, shows the "Extension" has the average p-value nearest zero, indicating the "Extension" ITM has moved to highest significance given this data set at a period.

FIG. 6A is an example of a computer generated comparison between an athlete's position and the comparative position of keypoints for a given ITM. The athlete can visualize the difference between the comparative (dots of key points and connecting lines), and the position of the athlete. As keypoint detection occurs for both the athlete and the comparative position, the system calculates the total difference between the two as a training margin or "Comparative Error". Comparative error identifies where body positioning can improve. Where consistent error occurs, consistent coaching can be applied. Each of the blue circles in the figure indicates comparative error and each is embedded with an automated coaching tip.

Figure 7:
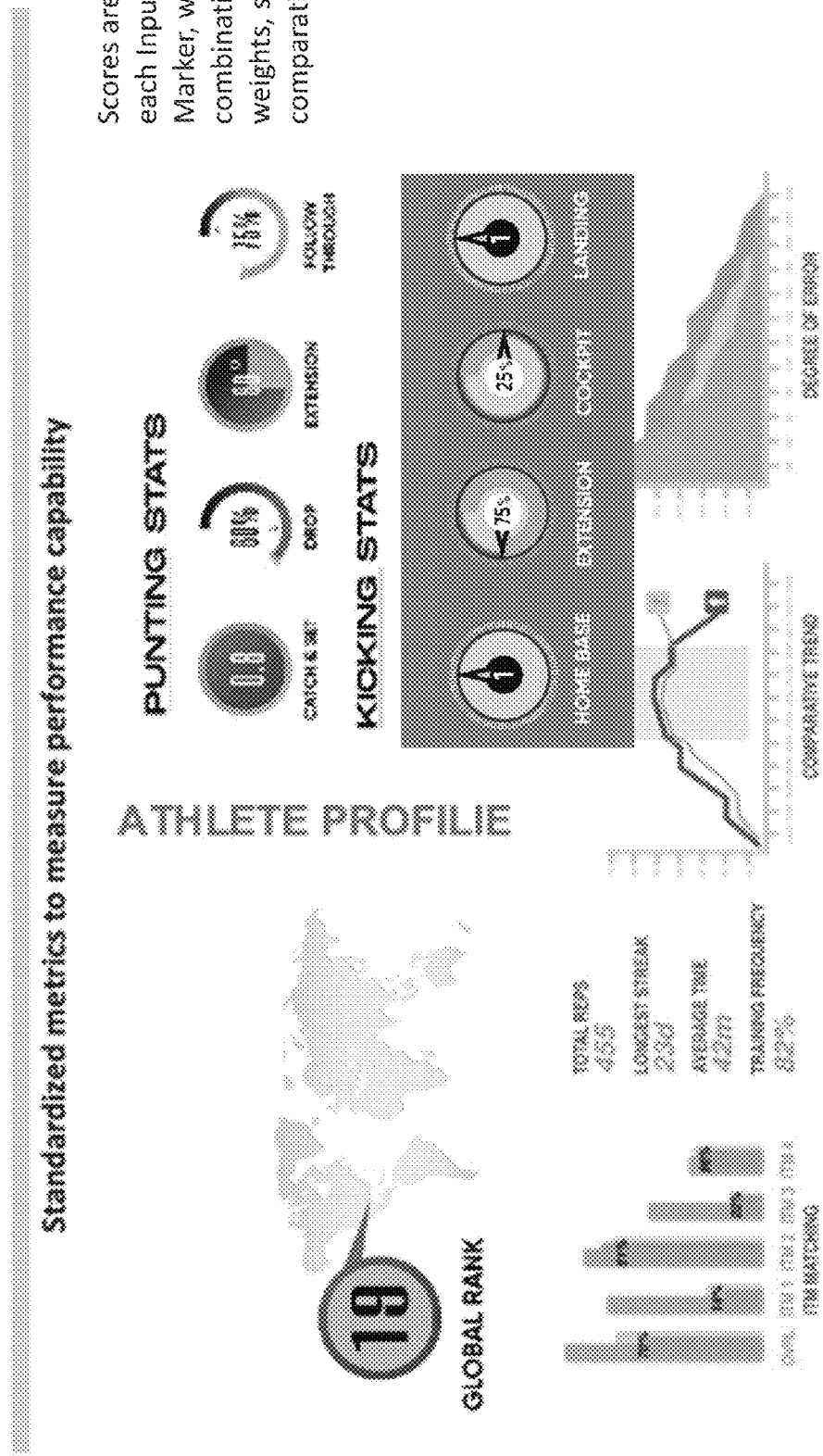
FIG. 7 illustrates an exemplary scoring method based on the analysis of the athlete motion for a given IAA and the comparison to the ITMs of that IAA.

FIG. 7 is an example of the output based on the analysis of the athlete motion for a given IAA and the comparison to the ITMs of that IAA. In this example of a kicking IAA, the athlete performed well in the ITMs of homebase, cockpit, and landing, but can improve in the extension ITM.

FIG. 8 is an example of an athlete performance profile. An athlete profile can be created for the athlete to use in advancing their selection by coaches and recruiters. In at least one embodiment, the athlete can create a performance resume in the system and can be coupled and verified with video data. The performance resume can be searchable and filterable for criteria. Coaches and recruiters can review scores for selection of athletes and review relative ITM video data. The performance profile can display the ITM scores as well as an overall rank against other athletes in the system. The athletes can also choose to compete with other athletes on the system by training to improve their scores.

Figure 26:
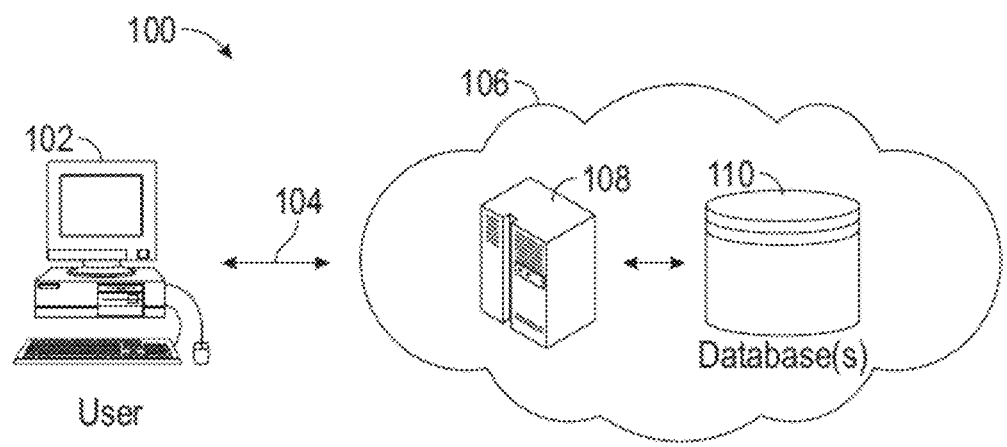
FIG. 26 illustrates an example of a computing system in which the steps for the athletic performance analysis and training, according to the disclosed embodiments.

FIG. 26 illustrates an example of a computing system in which the steps for the athletic performance analysis and training, according to the disclosed embodiments. As can be seen, the system can include at least one user processing device 102 that can be connected via a network connection 104 to a network 106. In the present example, the user-processing device 102 may be a desktop computer, notebook computer, tablet, smart phone, and other processing device, and the network connection 104 may be a wired and/or wireless network connection. Alternatively, the processing device 102 may be a stand-alone system that does not interface with a network or network servers. One or more network servers 108 may be connected to the network 106 with at least one database 110, which may be either an internal database that resides within the network servers 108, or a database that resides in a physically separate location from the network servers 108 (as shown here), depending on the constraints (e.g., size, speed, etc.) of the particular implementation. Note that the term "server" is used herein to include conventional servers, as well as high-end computers, workstations, mainframes, supercomputers, and the like. Similarly, the at least one database 110 may be a relational database, operational database, or other suitable database capable of storing data and information, including rules and criteria to define the normal patterns and anomaly patterns with potential associated disorders of the floating platforms and training examples for an expert system, pattern recognition, results of analysis, and other data as relevant to the processes described herein.

Figure 27:
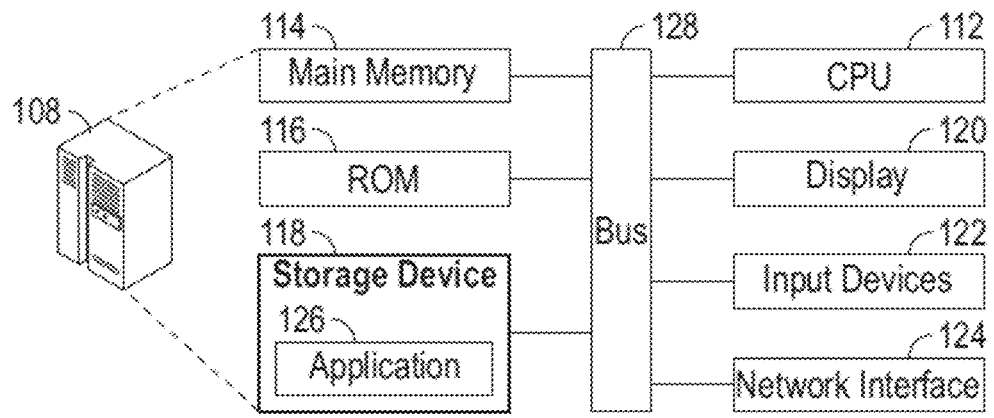
FIG. 27 illustrates an illustrative server that may be used as one of the one or more servers on the computing network.

FIG. 27 illustrates an illustrative server that may be used as one of the one or more servers 108 on the computing network 106. As mentioned earlier, this server 108 may be any suitable data processing system known to those having ordinary skill in the art, including a high-end server, workstation, mainframe, supercomputer, and the like. Such a server 108 typically includes a bus 128 or other communication mechanism for transferring information within the server 108, and a CPU 112 coupled with the bus 128 for processing the information. The server 108 may also include a main memory 114, such as a random access memory ("RAM") or other dynamic storage device coupled to the bus 128 for storing computer-readable instructions to be executed by the CPU 112. The main memory 114 may also be used for storing temporary variables or other intermediate information during execution of the instructions to be executed by the CPU 112. The server 108 may further include a read only memory ("ROM") 116 or other static storage device coupled to the bus 128 for storing static information and instructions for the CPU 112. A computer-readable storage device 118, such as a magnetic disk, optical disk, or solid-state memory device, may be coupled to the bus 128 for storing information and instructions for the CPU 112.

The term "computer-readable instructions" as used above refers to any instructions that may be performed by the CPU 112 and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, optical or magnetic disks, such as the storage device 118. Volatile media may include dynamic memory, such as main memory 114. Transmission media may include coaxial cables, copper wire, and fiber optics, including wires of the bus 128. Transmission itself may take the form of acoustic or light waves, such as those generated during radio frequency ("RF") and infrared ("IR") data communications. Common forms of computer-readable media may include, for example, a floppy disk, a flexible disk, hard disk, magnetic tape, other magnetic medium, a CD ROM, DVD, other optical medium, a RAM, a PROM, an EPROM, a FLASH EPROM, other memory chip or cartridge, or any other medium from which a computer can read.

The CPU 112 may also be coupled via the bus 128 to a display 120 for displaying information to a user. One or more input devices 122, including alphanumeric and other keyboards, mouse, trackball, cursor direction keys, and so forth, may be coupled to the bus 128 for communicating information and command selections to the CPU 112. A network interface 124 provides two-way data communication between the server 108 and other computers over the network 106. In one example, the network interface 124 may be an integrated services digital network ("ISDN") card or a modem used to provide a data communication connection to a corresponding type of telephone line. As another example, the network interface 124 may be a local area network ("LAN") card used to provide a data communication connection to a compatible LAN. Wireless links may also be implemented via the network interface 124. In summary, the main function of the network interface 124 is to send and receive electrical, electromagnetic, optical, or other signals that carry digital data streams representing various types of information.

In accordance with the disclosed embodiments, an application 126 for monitoring a group of floating platforms to detect anomalies in the platforms, or rather the computer-readable instructions therefor, may also reside on the storage device 118. The computer-readable instructions for the application 116 may then be executed by the CPU 112 and/or other components of the server 108 to detect the disorders in the platforms. Such an application 126 may be implemented using any suitable application development environment and programming language known to those having ordinary skill in the art to carry out the steps of the algorithms disclosed and described herein. As noted above, in various embodiments, the application 126 may be a stand-alone application that may be executed independent of other applications, or it may be in the form of a plugin module to an existing software package, and the like.

FIG. 8 is a diagram providing an overview of the present invention. In general, the invention provides on-field artificial intelligence, enhancing athletes and coaches to compete at an improved level. The system provides computer vision and machine learning models using keypoint detection, and pose estimation for a given athletic action, such as punting, kicking, throwing, jumping, swinging, lifting, running, twisting, flipping, bending, jousting, pushing, or any other athletic action (generally conducted with a given radius), herein referred to as an "isolated athletic action" or "IAA". For each isolated athletic action, a ML model can be developed and trained using keypoint detection and pose estimation to identify the specific moments used for standardized performance indicators. The performance indicators are herein referred to as "input training markers" or "ITMs" that can be standardized for a given IAA among the athletes using the invention. ITMs designated as the most useful moments, poses or body mechanics to provide coaching insight are used to train the computer vision ML models. The ITMs can be important micro-actions within a given IAA that have correlations with a specific performance outcome. Single ITMs can have correlations with each other as well as an outcome, providing purely data-driven coaching insight.

Devices capable of videos, including but not limited to mobile device cameras, digital cameras, professional videographic equipment, and other devices can record movement of the athlete through the selected isolated athletic action. Computer analysis of the recorded movement identifies video frames that show a position of the athlete at each input training marker and can automatically compare the athlete position to a comparative position at the ITM. The variance from the comparative position is identified, given values, and can be pictorially and quantifiably provided for guiding the athlete for corrective positioning and improvement for that ITM which ultimately improves overall performance for the IAA. The system can predict which ITM will maximize athletic performance and inform individual tailored performance training. One or more cameras can be used for one or more angles of the IAA. The analysis can be real time during a practice or competition to assist the athlete at that time with immediate specifically tailored focus. In at least one embodiment, the athletic performance data can be collected, assigned, and calculated into ITM scores and ranks.

The comparative positions used for scoring the athlete performance can be from data that has been previously populated into the system. The comparative positions can be derived from either generally well known athletes who have excelled in their field or from a prior recorded version of the subject athlete. Such comparative athletes can be measured for two and three-dimensional pose estimation and physio-anatomical measurements and their motions for their one or more relevant IAAs have been videoed, analyzed, recorded and can be recallable in the invention. The subject athlete to be analyzed can be measured for two and/or three-dimensional pose estimation and physio-anatomical measurements. Based on the subject athlete parameters, the system can correlate and recommend comparative athletes to model against and provide analyses for assessment and corrective recommendations for individual improvement.

In at least one embodiment, the participation of the comparative athlete can be encouraged by providing compensation to the comparative athlete when the subject athlete chooses that comparative athlete for the comparative analysis in the invention. The comparative athlete may also find satisfaction in being able to be chosen from others around the world for analysis and training improvement to those who would never have such an opportunity.

In at least one embodiment, the system uses machine learning and computer vision with convolutional neural networks and deep learning models to identify two and/or three dimensional pose estimation, physio-anatomical measurements as well as statistical modeling, and output correlation significance. The subject athlete video data and the comparative athlete video data is analyzed to understand the most significantly correlated actions at one or more ITMs to achieve a desired result. Further, the output can include predictive coaching output based on specific athlete generated independent actions and interpreting the data to provide individually designed athletic training. Without limitation, some technical features of the system include: Identifying keypoints in humans from videos, such as important joints in the body, anatomical positions, angles, azimuths, and so forth; Detecting and estimating significance of a specific pose of a human performing tasks, such as isolated athletic actions ("IAA"), using input training markers ("ITM") to understand the probability of a favorable outcome and/or performance improvement; Utilizing deep learning models to predict whether favorable outcomes can be achieved by an action in a particular sport (such as kicking a football between upright goal posts from a distance); and Interpreting developed models for pose estimation to identify patterns that result in favorable outcomes.

The system can be portable with downloadable software, such as in the form of a mobile application, for the use of specific sports training and coaching. The system can use advanced video analysis, computer vision and data visualizations for the identified IAA. FIG. 2 is a flow chart of the system and associated method. Some portions are illustrated with subsequent figures. In general, the system is activated on site, the athlete can be scanned by the system, or otherwise data input into the system, for two and/or three dimensional pose estimation, physio-anatomical measurements, and any other relevant attribute. The athlete performs the IAA while being videoed, and the system analyzes the video with specific ITMs assigned to specific frames in the video. Previously or in real time with the athlete, the system can electronically compute correlation significance of certain actions with a desired outcome and establish weights based on the correlation. The weights can be assigned to each ITM. The athlete's body motion can be assessed against a comparative body motion, specifically at each ITM, and a training margin to the comparative position be assigned to each ITM. The weight and the comparative error can converge to determine scores for each ITM of that IAA.

FIG. 3 are examples of isolated athletic actions and the related input training markers. These non-limiting examples are of serving a volleyball, kicking a football, drop back and pass, and sprinting out of blocks. In these IAAs, ITMs are identified as critical moments in the action to analyze and identify performance improvement opportunities. Computer analysis of the video showing the athlete performance can correlate relevant frames at the ITMs and produce a statistical correlation to a comparative ITM position and ultimately the outcome.

FIG. 4 further details ITM analysis as both being assigned statistical outcomes at each ITM and visual interpretation of comparative error at each ITM. The non-limiting example is kicking a football. In this IAA, four ITMs are identified as homebase, extension, cockpit, and landing. Scores are provided at each ITM based on statistical outcomes and variance from comparative ITMs. FIG. 5A is an example of the mathematic step in FIG. 2 of correlating significance of an input training marker and assigning an impact weight to a desired outcome. For the examples in FIG. 3, mathematical analyses, such as and without limitation logistic regressions, can be used to determine the correlation significance on y-dependent variable=Favorable Action (ex. Kick). In this example, "Cockpit" and "Landing" have a p-value near zero, meaning they are the most significant impacts on a favorable outcome. Correlation significance can change with new data (i.e., 100 kicks will be less informed than 1000 kicks). FIG. 5B illustrates the change in correlation significance based on subsequent additional data, revealing "Extension" has the single highest impact on a favorable outcome. IAA ML models can therefore be trained and learn correlation significance over time.

Figure 6:
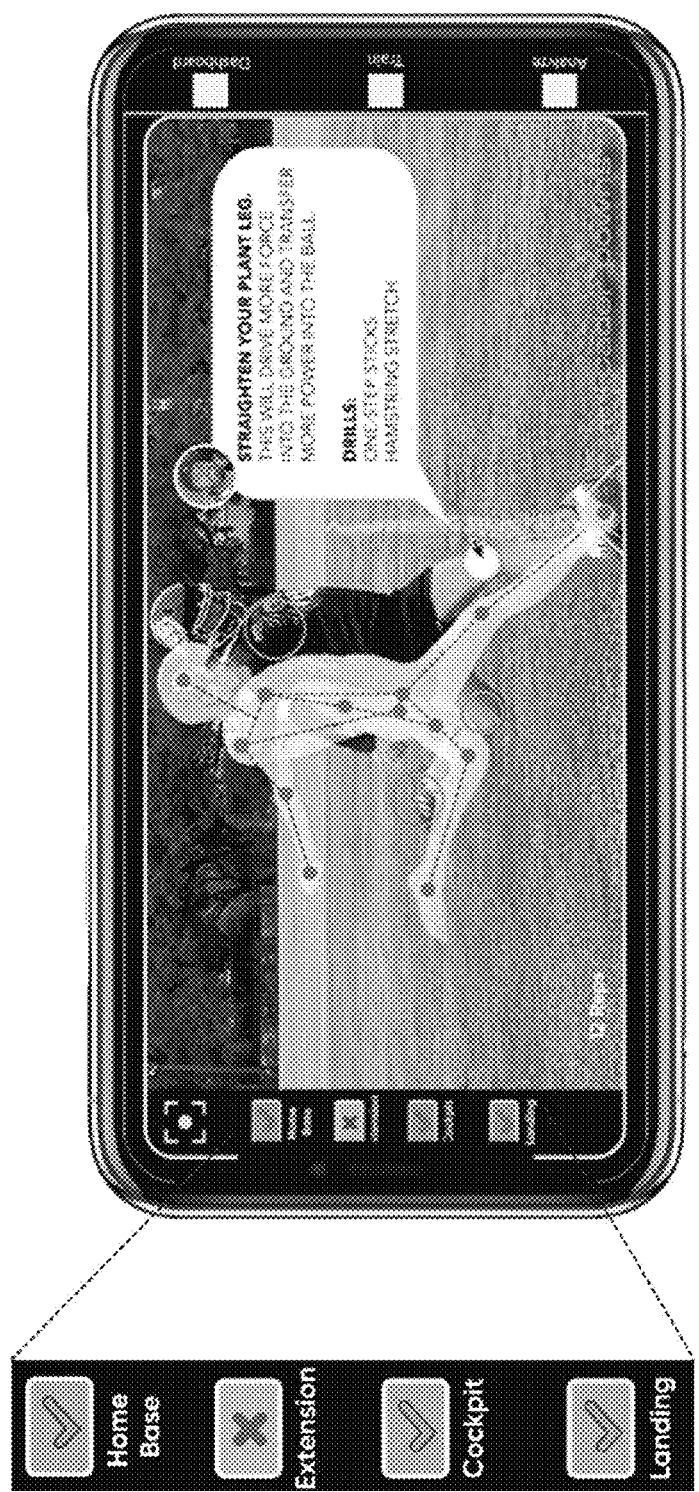
FIG. 6 is an example of a computer generated comparison between an athlete's position and the comparative position of keypoints for a given ITM.

FIG. 6 is an example of a computer-generated visual comparison between an athlete's position and the comparative position derived from the calculated variance among keypoints for a given ITM. FIG. 6 shows an example of comparative error, derived from the calculation of subject position and comparative position for a given ITM. In the example showing an extension ITM discussed above, the keypoints can be compared to their relative comparative positions of the ITM. The athlete can visualize the difference between the comparative (dots of key points and connecting lines), and the position of the athlete. As keypoint detection occurs for both the athlete and the comparative position, the system calculates the total difference and locations of comparative error and can indicate the quantity and impact on a favorable outcome. The combination of impact weights from ITM correlations as well as comparative error derive the overall score at each ITM illustrated with a "check" or "X." In this example of a kicking IAA, the athlete performed well in the ITMs of homebase, cockpit, and landing, but can improve in the extension ITM. The computer system will automatically assign pre-embedded coaching tips for identified comparative error. In this example, the error identified in the subject athlete's left leg, produces the coaching tip "straighten plant leg." Coaching tips can be automatically assigned for identified comparative error (i.e. anytime "Extension" error is identified and associated to specific keypoints, automated coaching tips are provided to subject athlete.

An athlete profile can be created for the athlete to collect performance metrics using the invention. The data provided for an athlete can be used in advancing their selection by coaches and recruiters. In at least one embodiment, the athlete can create a performance resume in the system and can be coupled and verified with video data. The performance resume can be searchable and filterable for criteria. Coaches and recruiters can review scores for selection of athletes and review relative ITM video data. The performance profile can display the ITM scores as well as an overall rank against other athletes in the system. The athletes can also choose to compete with other athletes on the system by training to improve their scores.

Embodiments of the system are operable to record videos of an athlete performing an isolated athletic action. In one embodiment, as few as 10 videos can be recorded to build a new model, but a larger number of videos will increase the robustness of the ITM identification model. In an exemplary model, each video should contain the entirety of the action being observed; each video should have enough lighting to clearly show the subject being filmed; videos containing multiple repetitions of an action should include space between the actions greater than the time needed to complete the action; the subject should be distinguishable from their background; videos are filmed at a minimum of 30 frames per second; videos are captured in a minimum of 720p resolution; angle of video capture should be consistent for the action being filmed; a stable camera with no panning will generate more reliable results; the main subject should either be the only person in frame or is significantly larger and more central to the camera view than any other person; and the main subject and any other persons in frame should not overlap during filming. The final videos may be stored with alike actions, creating a bank of videos that will be used to generate the data to train identification models.

Embodiments of the system use pose estimation, which refers to the computer vision process of detecting keypoints on a subject's body. These keypoints are typically the joints, such as knees, hips, shoulders, etc., when considering a human subject. The output of the pose estimation will result in a data matrix containing the pixel locations of each keypoint for each frame of the video. The data matrix can also contain information regarding the visibility of each keypoint. There should be a way to index through the frame numbers, the independent keypoints, and the features associated with each keypoint estimate. In addition to a pose estimation model, object detection can be used on actions that require a ball or target to be tracked. This object can be appended to the data matrix as additional keypoints. The features of the keypoints are not restricted to x-y pixel values. Keypoints can also include estimates in the z-direction from 3-dimensional pose estimates from either a base pose estimation model that supports this, or through lifting a 2-dimensional pose estimate to the third dimension.

Embodiments of the system use smoothing and anomaly detection to increase the efficacy of the method of scoring an individual's performance. For example, the estimates in each data matrix may go through a post-processing step to smooth the estimates, identify and replace anomalies (assumed to be incorrect estimates), and create a feature curve/continuous estimate of the subject's movement between the sampled frames. Various smoothing methods may be used, including but not limited to: (1) Moving average/Low-pass filter: sample a window of an individual keypoint's location values equally forward/backward in time. Compare this average to the keypoint of interest and average with it. The window size can be variable, and the weight the point of interest can have on the final average can also be varied. (2) Gaussian kernel convolution: Similar to the moving average in practice. Define an averaging window with a gaussian distribution, the components of which must sum to 1. The size of the window and the variance of the gaussian distribution can be changed. (3) Windowed Fourier Transform Filtering: Take a window of samples around a specific keypoint. Perform a Fast Fourier Transform on these points. Drop out the highest frequency components in the transformed signal. Reconstruct the signal. Choose to replace or average the reconstructed signal estimates with the actual samples. Window size can be varied. The amount of frequency component dropout can also vary. (4) Kalman Filter: create a model that predicts the next keypoint's location. Create another model that measures the confidence of any given sample. Assume the latent space and noise follows a gaussian mixture model. Take a weighted average between the sampled point and the predicted point, proportional to the confidence of the measured sample.

Embodiments of the system utilize anomaly detection and replacement to increase the efficacy of the method of scoring an individual's performance. Using a combination of the confidence/visibility of the data (recorded in the data matrix) and the smoothing outputs, anomalous samples can be identified and altered. Anomalies can be detected by reconstruction error that falls outside an allowable range. This threshold may be applied to the described smoothing processes above. A smoothed signal will contain some errors from the original sampled values. This error, if past the allowable threshold, will label the responsible keypoint as an anomaly and replace it with the smoothed estimate. Samples that are within the reconstruction threshold can still be altered by performing a weighted average with themselves and the smoothed signal proportional to the confidence of the sampled keypoint. Other methods that can be used in the post-processing outlier-throwout phase can include any of the methods that are standard in signal processing or data cleaning. Multiple versions of these outlier detectors can be run, and a probabilistic analysis of the returned anomalies can be performed and outliers dropped out. Data points that consistently get labeled as anomalies across multiple methods could be more readily discarded.

Embodiments of the method are operable to generate a feature curve of an athlete's isolated athletic action. The effect of smoothing and having higher confidence in the keypoint samples allows for the inference of the base signal that exists between samples. This interpolation relies upon the Nyquist-Shannon sampling theorem and assumes the kinematics of any keypoint contains frequency content of a suitable/low enough frequency that the sample rate (frame rate) satisfies the Nyquist-Shannon sampling requirement. If the samples can be assured to be within some minimal amount of error from the ground truth and the frame rate satisfies the necessary sampling rate, the continuous motion a keypoint takes can be reconstructed.

Using the continuous mapping of all of a subject's keypoints, points in time that are not captured by the camera can still be compared across different videos and different subjects. This also introduces a means of comparing the curve/paths that keypoints make rather than single keypoints in time. By using paths of movement, rather than individual points in time, the fidelity of the ITM selection (described later) can be increased since the samples are no longer reliant on the frame rate of the camera or the speed of the subject performing the action.

Another method of data processing can include dimensionality reductions. The high dimensionality of the data-matrices can be reduced using methods such as, but not constrained to: Principal Component Analysis, Autoencoders, Truncated SVD, Kernel PCA, and Random Forests. The benefits of using dimensionality reduction comes from reducing estimation noise, emphasizing the features that are the most important, reducing the computation costs later when training identification models, and reducing the possibility of overfitting when training.

Embodiments of the invention include ITM Frame Labeling. The smoothed data matrices can be applied directly to the videos where the pose estimates derive from. This draws a skeleton on the videos connecting keypoints on the subject. A frame counter is included to map visually what frame is being observed to the index within the data matrix. FIG. 9 shows the keypoints being drawn onto a video containing a frame counter that indexes where the data resides in the data matrix. Input Training Markers (ITMs): An ITM is a specific action or point in time that is directly related to a person's performance. These isolated points in time are a way to track and analyze a person's motion, and specifically, capture an instance that a person can improve on to increase their athletic performance. These ITMs are currently chosen by a coach or athlete as the specific instances in time that they want to analyze. An "ITM Frame" is the frame in which a subject is reaching one of the points defined above. These are also the frames which are to be extracted from the video from our models, and to train the models on what to look for, the frames of interest must be labeled and recorded. Using the frame counter as a reference, a table may be created containing the videos' names, the ITM Frames, and other metadata that may be necessary based on the type of action. These additional features can include whether the subject is left-handed/left-footed (which could require a full mirroring of the video), whether an internal mirroring is needed, and different subject IDs. This metadata can go towards correcting or sorting the data for the model training.

Embodiments of the invention include machine trained models for use with pose identification, for example. Model Training is required for pre-training/data preparation for use with the invention. For identified poses, one can drop out some of the keypoints that may not be significant in later analysis, or may be overly autocorrelated (example: dropping half of the keypoints identified within a face's pose estimation). Additional keypoints can also be added at this time that are generated directly from the base pose estimate (example: center of shoulders, center of torso, center between ears, etc.). For each video, the poses may be spatially normalized/stabilized so that the frames selected are unbiased and are only through the intrinsic characteristics of the pose itself. This occurs by centering each pose on an estimate of the subject's center of mass, then scaling the poses to take up a similar amount of space. Unbiasing the poses will allow the machine learning models to learn intrinsic features of the pose that make a given pose an ITM or not. A choice of center of mass estimate may use (1) the average between the left and right hip keypoints and/or (2) the average of the torso keypoints, for example. Two exemplary methods of scaling are bounding box and average concentric distances. Bounding box: find the keypoint that is furthest away from the chosen Center of Mass Estimate in the x-direction and y-direction (may not be the same point). Take the larger of the two distances, add a buffer percentage (variable), and create a square bounding box around the subject's pose. Establish a consistent box size to scale to (for example, 256×256) and scale the identified bounding box to this size. An example of this method can be seen in FIG. 10. Average Concentric Distances: Find the Euclidean Distance from the chosen Center of Mass Estimate of all keypoints. Find the average of these values. Use this value to scale to a consistent value across all poses going into the model training. An example of how this scaling makes two poses comparable can be seen in FIG. 11.

Embodiments of the invention may utilize base ITM detection models. An exemplary method is as follows. The batch of videos are split into training, validation, and test sets. For each video, the frames are broken down into PoseStreams. A PoseStream is a set of frames, n frames long, that is centered on a frame of interest (to have the stream centered on a single frame, n must be odd). See FIG. 12 for an example of how the frames and poses around an identified ITM Frame are combined to serve as the input to the classification model. The PoseStream is used as the input to the model, rather than single frames, to retain some of the temporal information that gives context to the ITM frames. The model does not identify ITM Frames from a single frame's pose data, it does so with the context of the poses surrounding the frame of interest. The PoseStream length can be varied. These pose streams are selected from the video in the following exemplary four steps: (1) There is one PoseStream selected for each ITM Frame labeled in the previously mentioned ITM Labeling table. This PoseStream is centered on the ITM Frame. (2) For each labeled ITM, n PoseStreams are randomly selected from the rest of the video that do not overlap/contain any ITM Frames. n can be varied for different actions, but as n increases, the PoseStreams containing ITMs make up a smaller proportion of the training data. A smaller n under samples the total number of PoseStreams present in the video. (3) If desired, one can oversample the PoseStreams containing ITM Frames by copying the PoseStream and adding some form of noise to the pose estimates. (4) The resulting PoseStreams become the direct data inputs into the following supervised identification models. The Labels for these inputs are the ITM label of the central frame in the PoseStream (1 for ITM 1, 2 for ITM 2, 0 for No ITM). Using PoseStreams as the input data, and ITM labels found in the ITM Labeling table, any Supervised Classification method of machine learning can be used to create prediction models. Some of the models, and their hyperparameters, initially trained include: K-Nearest Neighbors: k number of neighbors, weights for how closer neighbors affect classification, different distance metrics used in feature space (minkowski, cosine, etc.); Neural Network: number of hidden layers, number of nodes per layer, connection architecture, dropout, activation functions (relu, sigmoid, etc.), standard training parameters (decay, momentum, batch size, etc.); and Logistic Regression: Penalties. After training and validation, the resulting models are tested on the held out test set. This set is used to compare the performance of the models against each other in how well the models are classifying the frames. An output for all of the models may also include a confidence measure in their classification. This can be a number from 0 to 1. For the neural network, this can be the mapping of the output layer to its respective one-hot encoding. For Logistic Regression, this can be the error or penalty accrued at the classification. For the KNN, the following can be used to differentiate between classified points:

$$\text{KNN Score}(x) = \sum_{y \in \text{Neighbors}(x)} \frac{(y_{class} == \text{KNN}(x))}{\text{dist}(x, y)}$$

An example of how other classification models can be used is the LSTM. Using the same labels of data as before, instead of training an LSTM on PoseStreams, the centered and scaled poses are fed through the LSTM sequentially. LSTMs automatically retain the temporal dependence of data that the PoseStreams were designed to retain.

Embodiments of the invention create a video evaluator. With the base detector models, the video's entire stream of poses can be fed through each model, outputting an estimated label and a confidence in that label. However, this may return an excess number of frames being classified as ITM Frames. FIG. 6 shows this overclassification, but it also shows that the correct frame is being identified most of the time. The vertical colored bars show where the Base Model classified frames as ITM Frames, and the Star represents the true ITM Frame. The next task is to reduce the number of classified ITM Frames to one frame per ITM, and this is left to the confidence metric. For a single ITM present in the video, the maximum confidence peaks for each label are found, and the maximum sum of the confidences are found for a sequence of ITMs that happen in the correct order. For videos containing multiple repetitions of an action, the method is slightly different. The longest length of an action (defined in the training set) is set as a restriction window. The peaks in confidence for each ITM are found in the video, same as in the single rep detection. Then, collections of those peaks are found that reside within the restriction window's length. To assure that no ITMs are missed, or that no ITMs are mislabeled for different repetitions of the action, it is required that repetitions of a single action be spaced out greater than the length of the action itself. For example, an action that takes 3 seconds must have more than 3 seconds before repeating the action.

Windows that contain peaks of confidence for the majority of ITM frames are extracted and frames within that window are chosen in the same way as the single action methods. FIG. 7 shows this method at work on a video with five different reps being detected. These methods are placed after the base trained model, and performance is evaluated on the complete test videos (rather than just the PoseStreams). The methods are evaluated on their accuracy of identifying the ITM frames, and the best performing method becomes the saved Video Evaluator.

FIG. 15 shows an example of how well a Video Evaluator performs for a given action. This histogram shows whether a frame was correctly labeled as the ITM Frame (x-label of 0) or, if the frame labeled for a video was mislabeled, by how many frames did it miss the correct ITM Frame. If the performance of the Video Evaluator is satisfactory, a new video of the same action can be processed and have its ITMs extracted. The video still goes through pose estimation, smoothing and anomaly detection, and centering and scaling before classification can occur. Once the data matrix for the new video goes through the above steps, the processed data can be fed into the model as input, and a key-value object will be returned (keys being the ITM number, values being the frame of the video in which the ITM was detected).

Embodiments of the invention create a comparative between the subject athlete training and standardized performance indicators for a particular pose or isolated athletic action, as illustrated in FIG. 14, for example. Extracted ITM Frames provide a type of Temporal Normalization across different videos of the same action. Whether it is the same subject performing multiple repetitions of the action, or if it is two separate people, selecting out ITM frames allows for a direct comparison between two or more different samples of an action. The "Temporal Normalization" aspect of comparing two actions' ITM Frames comes from the actions not needing to happen at the same speed or at the same time during the videos. A Comparative can be the pose that a subject compares themself to after ITM Frames are detected and extracted. Examples of a comparative are: (1) the poses within the ITM Frames of a different athlete's single attempt; (2) an aggregate of the poses of a different athlete's multiple attempts; (3) the poses within the ITM Frames of the subject's single attempt; (4) an aggregate of the poses of a subject's multiple attempts; (5) the pose of an aggregate of multiple athletes performing the action; (6) an idealized/model pose hand made for each ITM Frame; and (5) an optimized pose for ITM frames determined through correlations to positive outcomes. For options 1-5, the pose estimate and cleaning can follow the same procedure as that described earlier. ITM for comparatives can be identified by the Video Evaluator or hand selected. Aggregates of poses can be any method that combines the poses in a logical or statistical manner (for example, taking the average pose at each identified ITM Frame or combining specific keypoints of one attempt with the keypoints of another attempt into one pose). For options 6 and 7, a more thorough building of the pose will need to be performed. Hand placing keypoints to reflect a specific pose can be sufficient for option 6. Option 7 could require outcomes of an action followed by a statistical analysis of the keypoints and poses most correlated with the positive outcomes. These statistically identified keypoints/poses could then be combined as in option 5. This optimal model can be generated through The global aggregate of IAA data can be used to produce a purely data driven, optimal model (BeONE Avatar). In whichever method the comparative is created, it should result in a normalized coordinate mapping of a pose with the same number of keypoints as the ITM Detection models. The comparative can also include a semi-transparent avatar that can be overlaid on a future subject's ITM Frames.

Embodiments of the invention are operable to generate an overlay and score. FIG. 9 shows an exemplary flow for taking the outputs of the ITM Identification step and the comparative and resulting in a single similarity score. The overlay step takes in the ITM Frames, the subject's pose data at those frames, and the comparative's data for those ITMs.

Within the overlay step, scaling and shifting can be applied to the comparative's pose in the same way as described in the model pre-training step above. The comparative can be aligned to a relevant keypoint(s) in the subject's pose data as reference. Then, scaling can be applied using the bounding box or average concentric distances method demonstrated in FIGS. 10 and 11. Another way the comparative can be aligned is using simple optimization. The amount of shift in the x-direction, y-direction, scaling factor, and rotation can be the inputs to an optimization problem where the error between the comparative and subject's poses are the output. Minimizing this error can be more computationally expensive but can regress to another form of aligning and scaling the comparative to the subject. The representative of the comparative on top of the subject can be displayed using the comparative's pose data to make a skeleton drawing or by using the avatar. FIG. 17 shows an example of the output image after this step.

The difference between the poses is found and normalized proportionally to how much the comparative was scaled (this avoids bias in videos/subjects of different size). This pose difference matrix is saved and inputted into a comparative score calculator. This score takes on values from 1 to 100 and is a representative of how similar the subject's pose is to the comparative's pose.

Each joint in the pose difference matrix is categorized to "bins" with values of 1-5, 1 being minimal error, 5 being the maximum error. The value each joint is assigned to is directly related to the amount of error present for that joint in the Pose Difference Matrix. FIG. 11 shows a histogram describing the frequency that a given joint falls into the five categories across multiple videos. The end result of this step should be a categorized distance vector of values 1-5 for each keypoint. Different methodologies to assign the joint difference values can include: (1) Bins with linear increments, Bin edges: [0, n, 2n, 3n, 4n, >4n]; (2) Bins that categorize distances on a Uniform distribution (built on training data); (3) Bins that categorize distances to a Normal distribution (built on training data); and (4) Sigmoid mapping inputs to values between 1 and 5. Once the joint differences are categorized to values between 1-5, each joint's effect on the final score is weighed using an importance vector. The importance vector allows for some joints to have a larger impact on the final similarity score. The preliminary score is found by taking the inner product between the categorized distance vector and the importance vector. This preliminary score is then linearly mapped to a value from 0-100 with a 0 being the worst possible score (categorized distance vector of all 5s) and a 100 being the best possible score (categorized distance vector of all 1s). These values correlate to a percentage of similarity with a denominator of 100. A score of 100 is perfect.

Multiple categorization methodologies and importance vectors may be analyzed. The categorization method and the importance vectors can be manipulated to make it easier or more difficult for a user to achieve a perfect match score with the Comparative. FIG. 19 shows an example of one ITM Frame analyzing 6 different categorization methods with 6 different Importance Vectors.

FIG. 20 shows how the scores of many actions are distributed for different scoring combinations. A specific scoring combination becomes the scoring parameters for the final calculation of a comparative score. A final Action score can be found by averaging all of the comparative scores for each ITM. This provides a single metric to score or rank an entire action for a subject.

Embodiments of the invention enable user analysis and Feedback from Extracted Frames and Pose. The outputs of the overlay and ITM Frame extraction step also allow for further analysis of a subject's pose. FIG. 21 shows how the pose data being extracted at ITM Frames can be used for feedback and analysis. A single video generates a single pose for each ITM Frame. Using the same overlay methodology mentioned previously, for multiple repetitions of the same action, one can derive a subject's average position at each ITM Frame. One can also identify the joints that have the maximum variance rep-to-rep. FIG. 22 shows how two joints (the left elbow and wrist) with the most variance can be mapped to blue rings. The radii of these rings are proportional to the variance of the points found across the reps. The size and existence of these blue rings are a method of communicating a subject's consistency at performing a given action. Larger rings are caused by larger inconsistencies in the subject's movement.

When including the comparative to these analysis images, one can also draw arrows from the subject's joints to their respective place on the comparative. Longer arrows are proportional to larger errors in the subject's pose at a given ITM Frame. The arrows directing improvements, the blue rings communicating consistency, and the scoring methodology described previously all contribute to the outputs of this entire system. FIG. 16 shows the flow of a general use case by a user. The user inputs video of an action they have performed (for an action that has a trained video evaluator). The ITM Frames are extracted, and a comparative is applied. A score is returned to give the user a summary analysis of their action. An overlay of the comparative with arrows directing the joints that need improvement tells the user how to improve their score. Blue rings are contained in the image returned to the user to show where they can improve their consistency. All of these analyses also give the user a data-driven approach to measure their progress. Blue rings that shrink confirm that a user is becoming more consistent. The scoring methods offer a metric to track a user's progress with the goal of achieving perfect scores for all ITMs. In addition to the returned visuals, one can attach coaching tips to the final analysis. These coaching tips can be triggered by the specific error between the user and the comparative or other intrinsic data that is collected from the pose and multiple videos. These tips can range from specific coaching cues to exercises the user can perform that may improve their performance.

Figure 25:
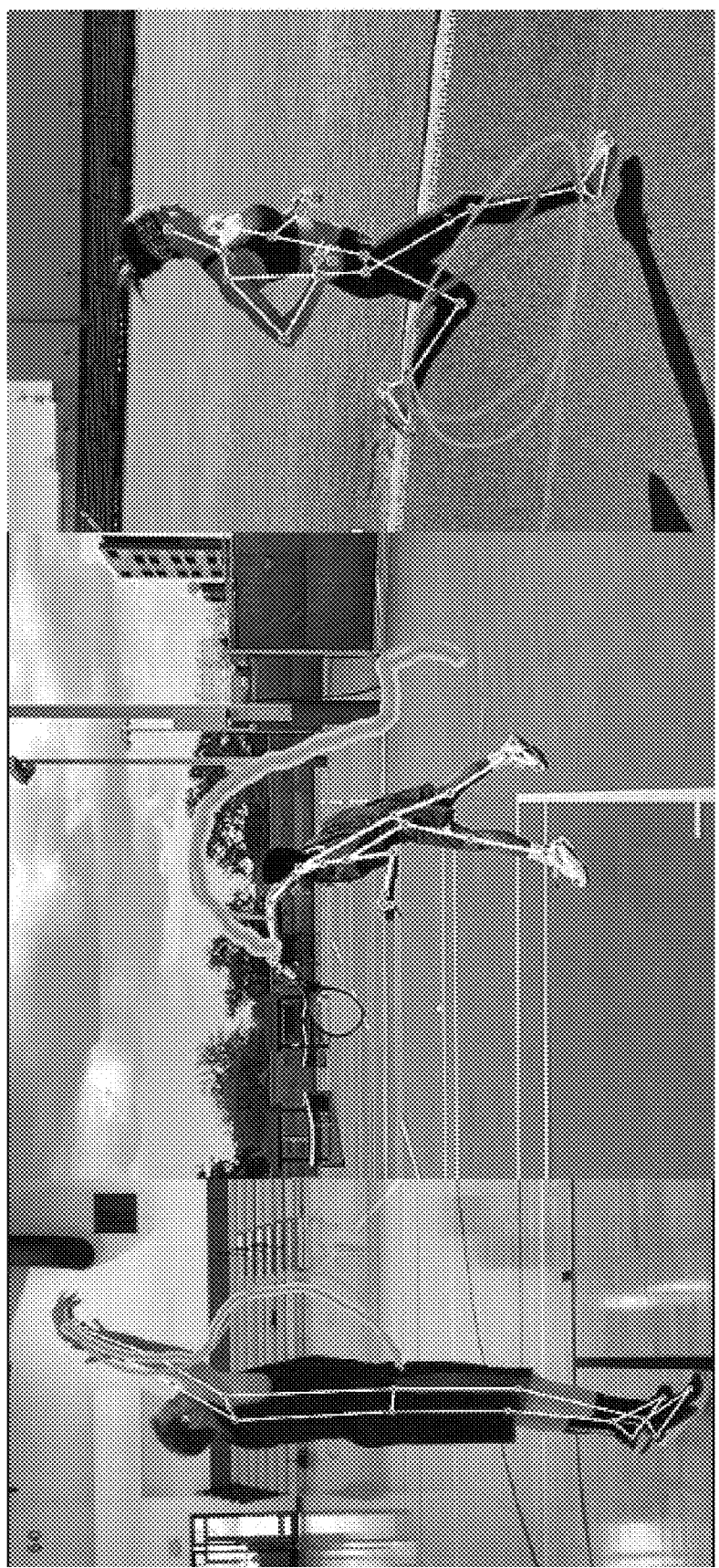
FIG. 25 illustrates feature curves representing motion paths (series of key points over time) to become the comparative element.

FIG. 25 illustrates the creation of motion tracks with the system. The motion paths, representing a series of key points over time, are used to become the comparative element. As illustrated, the blue motion path is the subject and the comparative motion path is green.

For the purposes of promoting an understanding of the principles of the invention, reference has been made to the preferred embodiments illustrated in the drawings, and specific language has been used to describe these embodiments. However, this specific language intends no limitation of the scope of the invention, and the invention should be construed to encompass all embodiments that would normally occur to one of ordinary skill in the art. The particular implementations shown and described herein are illustrative examples of the invention and are not intended to otherwise limit the scope of the invention in any way. For the sake of brevity, conventional aspects of the system (and components of the individual operating components of the system) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. A computer-implemented method comprising:
   performing, by a system of analyzing and training athletic performance implemented on one or more processors and associated memory:
   capturing a series of images of an individual performing an isolated athletic action;
   stabilizing said series of images wherein said individual performing said athletic action in each image of said series of images appears similar in size;

recognizing said isolated athletic action from said series of images performed by said individual;

identifying input training markers of said isolated athletic action in said series of images;

smoothing said identified input training markers of said isolated athletic action in said series of images to identify and replace anomalies to create a feature curve or continuous estimate of the individual's movement between said images;

generating a scaled overlay of a set of standardized performance indicators of input training markers on said series of images of said individual performing said isolated athletic action; and calculating a score of said individual's input training markers of said isolated athletic action relative to said set of standardized performance indicators of input training markers.

2. The computer-implemented method of claim 1, wherein the step of recognizing from said series of images of said isolated athletic action performed by said individual is performed by one or more machine learning models using keypoint detection and pose estimation.

3. The computer-implemented method of claim 1, further comprising the step of displaying predictive coaching output for said isolated athletic action based on input training markers of said isolated athletic action in said series of images.

4. The computer-implemented method of claim 1, wherein said overlay is a wireframe and keypoints of anthropomorphic points of said individual.

5. The computer-implemented method of claim 1, wherein said overlay is scaled and shifted to match a scale and pose of said individual to align to a reference point of said individual.

6. The computer-implemented method of claim 1, further comprising the step of repeating said method to derive an individual's average position at each input training marker of each image of said series of images.

7. The computer-implemented method of claim 1, further comprising a database of input training markers of isolated athletic actions.

8. The computer-implemented method of claim 1, further comprising a step of capturing an image of an individual and measuring physiological dimensions of said individual.

9. The computer-implemented method of claim 8, wherein the step of generating a scaled overlay of a set of standardized performance indicators of input training markers on said series of images of said individual performing said isolated athletic action is scaled by matching said overlay of a set of standardized performance indicators with said physiological dimensions of said individual.

10. A system comprising:
one or more computers that implement an athletic performance analysis training system, configured to:
perform, by a system of analyzing and training athletic performance implemented on one or more processors and associated memory:
receive a series of images of an individual performing an isolated athletic action;
stabilize said series of images wherein said individual performing said athletic action in each image of said series of images appears similar in size;
recognize said isolated athletic action from said series of images performed by said individual;
identify input training markers of said isolated athletic action in said series of images;
smooth said identified input training markers of said isolated athletic action in said series of images to identify and replace anomalies to create a feature curve or continuous estimate of the individual's movement between said images;
generate a scaled overlay of a set of standardized performance indicators of input training markers on said series of images of said individual performing said isolated athletic action; and
calculate a score of said individual's input training markers of said isolated athletic action relative to said set of standardized performance indicators of input training markers.

11. The system of claim 10, further comprising a device operable to capture said series of images of an individual performing an isolated athletic action.

12. The system of claim 10, further comprising a device operable to display said generated scaled overlay of said set of standardized performance indicators of input training markers on said series of images of said individual performing said isolated athletic action.

13. The system of claim 10, wherein said recognition from said series of images of said isolated athletic action performed by said individual is performed by one or more machine learning models using keypoint detection and pose estimation.

* * * * *